(12) United States Patent
Jia et al.

(10) Patent No.: US 12,543,108 B2
(45) Date of Patent: Feb. 3, 2026

(54) AUXILIARY-LINK-BASED CALL COMPENSATION SYSTEM AND APPARATUS, AND CHIP

(71) Applicant: Huawei Technologies Co., Ltd., Shenzhen (CN)

(72) Inventors: Yinyuan Jia, Shanghai (CN); Weilin Gong, Shenzhen (CN); Zhifeng Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 17/910,724

(22) PCT Filed: Mar. 12, 2021

(86) PCT No.: PCT/CN2021/080454
§ 371 (c)(1),
(2) Date: Sep. 9, 2022

(87) PCT Pub. No.: WO2021/180202
PCT Pub. Date: Sep. 16, 2021

(65) Prior Publication Data
US 2023/0132875 A1 May 4, 2023

(30) Foreign Application Priority Data

Mar. 12, 2020 (CN) .......................... 202010169865.6
Apr. 29, 2020 (CN) .......................... 202010356941.4

(51) Int. Cl.
*H04W 48/18* (2009.01)
*H04W 8/18* (2009.01)
(Continued)

(52) U.S. Cl.
CPC ........... *H04W 48/18* (2013.01); *H04W 8/183* (2013.01); *H04W 28/0268* (2013.01); *H04W 76/15* (2018.02)

(58) Field of Classification Search
CPC . H04W 48/18; H04W 8/183; H04W 28/0268; H04W 76/15; H04W 76/14;
(Continued)

(56) References Cited

U.S. PATENT DOCUMENTS

| 8,200,200 B1 | 6/2012 | Belser et al. |
| 8,385,891 B2 | 2/2013 | Cheneau |

(Continued)

FOREIGN PATENT DOCUMENTS

| CN | 101232681 A | 7/2008 |
| CN | 101360054 A | 2/2009 |

(Continued)

OTHER PUBLICATIONS

Schulzrinne, H. et al., "RTP: A Transport Protocol for Real-Time Applications," Network Working Group, Request for Comments: 3550, Obsoletes: 1889, Category: Standards Track, Packet Design, Jul. 2003, 104 pages.

*Primary Examiner* — Kabir A Timory
(74) *Attorney, Agent, or Firm* — Slater Matsil, LLP

(57) ABSTRACT

This application relates to the field of communications technologies, and in particular, to an auxiliary-link-based call compensation system and apparatus, and chip. The system includes: a first terminal, a second terminal, and a core network device. The first terminal and the second terminal establish a primary link in response to a dialing operation entered by a user. The first terminal and the second terminal establish at least one auxiliary link in response to an auxiliary link establishment condition. The first terminal transmits call data packets with the second terminal by using (Continued)

the primary link and the at least one auxiliary link. The first terminal and/or the second terminal performs post-processing and playing on the call data packets received by using the primary link and the at least one auxiliary link.

20 Claims, 21 Drawing Sheets

(51) Int. Cl.
*H04W 28/02* (2009.01)
*H04W 76/15* (2018.01)

(58) Field of Classification Search
CPC ....... H04W 4/16; H04W 36/03; H04W 36/08; H04W 36/30; H04W 76/10; H04W 76/18; H04L 65/1095; H04L 65/80; H04N 21/632; H04N 21/6437; H04N 21/64738
See application file for complete search history.

(56) References Cited

U.S. PATENT DOCUMENTS

| | | | |
|---|---|---|---|
| 10,652,138 B2 | 5/2020 | Xue et al. | |
| 2011/0221858 A1* | 9/2011 | Laiho | H04N 21/6181 348/14.02 |
| 2015/0078298 A1* | 3/2015 | Barriac | H04W 84/12 370/329 |
| 2019/0158385 A1* | 5/2019 | Patil | H04W 76/15 |
| 2020/0374962 A1 | 11/2020 | Wu et al. | |
| 2023/0146138 A1* | 5/2023 | Asterjadhi | H04W 52/0219 370/311 |

FOREIGN PATENT DOCUMENTS

| | | |
|---|---|---|
| CN | 101589606 A | 11/2009 |
| CN | 101964817 A | 2/2011 |
| CN | 103944697 A | 7/2014 |
| CN | 105282564 A | 1/2016 |
| CN | 105897478 A | 8/2016 |
| CN | 106304117 A | 1/2017 |
| CN | 102791045 B | 3/2017 |
| CN | 110312287 A | 10/2019 |
| CN | 110460801 A | 11/2019 |
| EP | 3094132 A1 | 11/2016 |
| EP | 3550888 A1 | 10/2019 |
| WO | 02052859 A1 | 7/2002 |
| WO | 2017071309 A1 | 5/2017 |
| WO | 2017071310 A1 | 5/2017 |
| WO | 2018072202 A1 | 4/2018 |
| WO | 2019158058 A1 | 8/2019 |
| WO | 2019237999 A1 | 12/2019 |

* cited by examiner

AUXILIARY-LINK-BASED CALL COMPENSATION SYSTEM AND APPARATUS, AND CHIP

CROSS-REFERENCE TO RELATED APPLICATIONS

This application is a national stage of International Application No. PCT/CN2021/080454, filed on Mar. 12, 2021, which claims priority to Chinese Patent Application No. 202010169865.6 filed on Mar. 12, 2020 and Chinese Patent Application No. 202010356941.4, filed on Apr. 29, 2020. All of the aforementioned applications are hereby incorporated by reference in their entireties.

TECHNICAL FIELD

This application relates to the field of communications technologies, and in particular, to an auxiliary-link-based call compensation system and apparatus, and a chip.

BACKGROUND

During a call, a terminal needs to be connected to an internet protocol multimedia subsystem (Internet Protocol Multimedia Subsystem, IMS) core network device by using an access network element (for example, a device such as a base station or a Wi-Fi router), to establish a call link to transmit a call data packet. However, due to poor network distribution, mutual interference between a plurality of networks, building blocking, or the like, a network signal transmitted by the access network element may be weak when being receiving by the terminal or even fail to be received by the terminal. Therefore, in a call process, a large quantity of call data packets in the call link may be lost, a delay may be excessively long, or a jitter may be excessively large, resulting in problems such as voice discontinuity, no sound, or even call dropping.

SUMMARY

This application provides an auxiliary-link-based call compensation system and apparatus, and chip, so as to resolve a prior-art problem of a call exception such as voice discontinuity, no sound, or even call dropping of a terminal in a call process, and improve call quality.

To achieve the foregoing objective, this application uses the following technical solutions.

According to a first aspect, an auxiliary-link-based call compensation system is provided, including a first terminal, a second terminal, and a core network device, where the first terminal and the second terminal are connected by using the core network device, and establish a primary link; and the first terminal is configured to: establish at least one auxiliary link with the second terminal in response to an auxiliary link establishment condition, where the auxiliary link is different from the primary link; and transmit call data packets with the second terminal by using the primary link and the at least one auxiliary link.

By using the auxiliary-link-based call compensation system provided in this embodiment, the first terminal and the second terminal may use the auxiliary link and the primary link to jointly transmit the call data packets, thereby improving problems such as call discontinuity, no sound, and video frame freezing caused by a network signal exception, and improving call quality.

In some embodiments, the auxiliary link is: a point-to-point auxiliary link established according to an IP protocol or a D2D protocol; or a server auxiliary link established according to an IP protocol or a D2D protocol; or a core network link based on a base station, where both the first terminal and the second terminal are connected to the core network device by using the base station; or a core network link based on a Wi-Fi device, where both the first terminal and the second terminal are connected to the core network device by using the Wi-Fi device.

The IP protocol may be IPv4 or IPv6. The point-to-point auxiliary link or the server auxiliary link can be used to reduce dependency of a call process on an access network element or a core network device. Even if the access network element or the core network device is abnormal during the call process, current call quality of the terminal can be improved to some extent. The core network link based on the base station or the core network link based on the Wi-Fi device is used as the auxiliary link, so that existing resources can be fully utilized.

In some embodiments, the primary link is a core network link based on the base station or a core network link based on the Wi-Fi device.

In some embodiments, the auxiliary link establishment condition includes: the first terminal receives a dialing operation entered by a user; or the first terminal displays a ringing interface; or the first terminal receives a call answering operation entered by a user; or the first terminal is currently in an abnormal geographical location; or the first terminal is being handed over from a first abnormal cell to a second abnormal cell; or call quality of the first terminal is abnormal on the primary link, where the abnormal geographical location, the first abnormal cell, and the second abnormal cell are determined by the first terminal based on a historical call process of the first terminal.

In some embodiments, that the call quality is abnormal includes: uplink/downlink quality is abnormal; or uplink/downlink data transmission quality is abnormal; or an encoding format of the call data packet is a preset encoding format on the primary link; or at least one of a sampling rate, an encoding rate, encoding quality, resolution, a frame rate, a quantity of sound channels, or a MOS value of the call data packet is less than a respective corresponding threshold on the primary link.

By using the foregoing auxiliary link establishment condition, the terminal may establish the auxiliary link in advance, so as to enable the auxiliary link at any time when the call quality is abnormal, thereby improving the call quality. Alternatively, the auxiliary link may be established when it is predicted that a call may be abnormal, so as to quickly improve call quality. Alternatively, the auxiliary link starts to be established after the call quality exception is detected, so as to reduce resource overheads of the terminal.

In some embodiments, when the auxiliary link is the point-to-point auxiliary link, that the first terminal establishes the auxiliary link with the second terminal includes:

The first terminal sends an IP address and a port number of the first terminal to the second terminal by using the primary link; the first terminal receives a first link detection command sent by the second terminal, where the first link detection command is used to detect whether the IP address and the port number of the first terminal can be used to successfully receive a message; and the first terminal sends a first response message to the second terminal based on the first link detection command.

The point-to-point auxiliary link is in a unidirectional transmission mode, and is used by the second terminal to send a call data packet to the first terminal. When only data transmission from the second terminal to the first terminal is abnormal on the primary link, not only call quality can be improved in the unidirectional transmission mode, but also resource overheads of the terminal can be reduced.

In some embodiments, when the auxiliary link is the point-to-point auxiliary link, that the first terminal establishes the auxiliary link with the second terminal further includes:

The first terminal receives an IP address and a port number of the second terminal by using the primary link; the first terminal sends a second link detection command to the second terminal, where the second link detection command is used to detect whether the IP address and the port number of the second terminal can be used to successfully receive a message; and the first terminal receives a second response message sent by the second terminal, where the second response message is used to respond to the second link detection command.

The point-to-point auxiliary link is in the unidirectional transmission mode, and is used by the first terminal to send the call data packet to the second terminal. When only data transmission from the first terminal to the second terminal is abnormal on the primary link, not only call quality can be improved in the unidirectional transmission mode, but also resource overheads of the terminal can be reduced.

In addition, the foregoing two unidirectional transmission modes may also be used in combination, and call data packets are transmitted bidirectionally between the first terminal and the second terminal by using the auxiliary link.

In some embodiments, when the auxiliary link is the server auxiliary link, the system further includes a server, and that the first terminal establishes the auxiliary link with the second terminal includes:

The first terminal sends an auxiliary link establishment request to the server, where the auxiliary link establishment request carries a second feature identifier of the second terminal, so that the server sends the auxiliary link establishment request to the second terminal based on the second feature identifier; and the first terminal receives a response message sent by the second terminal, where the response message is used to respond to the auxiliary link establishment request.

The server auxiliary link is established in request-response mode. This ensures reliability of the server auxiliary link and prevents a failure to establish the server auxiliary link because a terminal cannot connect to the server.

In some embodiments, when the auxiliary link is the server auxiliary link, the system further includes a server, and that the first terminal establishes the auxiliary link with the second terminal includes: The first terminal and the second terminal each actively establish a connection to the server to form the server auxiliary link.

By establishing the server auxiliary link in advance, the terminal may enable the auxiliary link at any time during a call and transmit call data packets by using the auxiliary link, thereby quickly improving call quality.

In some embodiments, that the first terminal transmits the call data packets with the second terminal by using the primary link and the at least one auxiliary link includes:

The first terminal sends call data packets to the second terminal by using the primary link and the at least one auxiliary link; and the first terminal receives, by using the primary link and the at least one auxiliary link, call data packets sent by the second terminal.

In some embodiments, that the first terminal sends the call data packets to the second terminal by using the primary link and the at least one auxiliary link includes: The first terminal sends a plurality of first call data packets to the second terminal by using the primary link, and sends a plurality of second call data packets to the second terminal by using the at least one auxiliary link, where the plurality of first call data packets and the plurality of second call data packets are completely the same, or completely different, or partially the same, and a sum of the plurality of first call data packets and the plurality of second call data packets includes all call data packets collected by the first terminal.

When the plurality of first call data packets and the plurality of second call data packets are completely the same, a quantity of call data packets missing by the second terminal can be reduced. When the plurality of first call data packets and the plurality of second call data packets are completely different or only partially the same, transmission pressure of the call data packets on the primary link can be reduced, and call quality can be improved.

In some embodiments, that the first terminal sends the call data packets to the second terminal by using the primary link and the at least one auxiliary link includes:

The first terminal detects an uplink call quality parameter of the first terminal; and when the uplink call quality parameter falls within a preset range, the first terminal keeps a sampling rate, an encoding scheme, a encoding rate, encoding quality, resolution, a quantity of sound channels, or a frame rate of call data in the sent call data packet unchanged; when the uplink call quality parameter is better than the preset range and continues to be optimized, the first terminal increases at least one of a sampling rate, an encoding scheme, an encoding rate, encoding quality, resolution, a quantity of sound channels, or a frame rate of call data in the sent call data packet; or when the uplink call quality parameter is worse than the preset range and continues to become worse, the first terminal reduces at least one of a sampling rate, an encoding scheme, an encoding rate, encoding quality, resolution, a quantity of sound channels, or a frame rate of call data in the sent call data packet.

By using a call data packet sending manner provided in this embodiment, the sampling rate, the encoding scheme, the encoding rate, the encoding quality, the resolution, or the frame rate of the call data in the call data packet may be adjusted based on link quality, so that call quality of the first terminal and the second terminal is maintained in an optimal state as much as possible.

In some embodiments, the first terminal is further configured to perform post-processing and playing on the call data packets received by using the primary link and the at least one auxiliary link, where the post-processing includes combination, deduplication, and sorting.

In some embodiments, when the plurality of first call data packets received from the primary link and the plurality of second call data packets received from the auxiliary link have sequence numbers of the same type, the combination includes: aggregating the plurality of first call data packets and the plurality of second call data packets into a combined call data packet.

By using a call data packet combination manner provided in this embodiment, all call data packets received by the terminal can be maximumly retained, a loss of a call data packet received by the second terminal is reduced, and call quality is improved.

In some embodiments, when the plurality of first call data packets received from the primary link and the plurality of second call data packets received from the auxiliary link have sequence numbers of different types, the combination includes: determining link quality parameters of the primary link and each auxiliary link; determining an optimal call link or at least two auxiliary links based on the link quality parameters; and using a call data packet received from the optimal call link as a combined call data packet, or combining call data packets on the at least two auxiliary links to obtain a combined call data packet.

In this embodiment, based on the link quality parameter of each link, the best call link may be a primary link or an auxiliary link. By using a call data packet combination manner provided in this embodiment, resource overheads when the terminal combines the call data packets can be reduced, and call quality can be improved.

In some embodiments, when the plurality of first call data packets received from the primary link and the plurality of second call data packets received from the auxiliary link have sequence numbers of different types, the combination includes: performing audio and video feature fusion on the first call data packet and the second call data packet, to obtain a fused call data packet; and using the fused call data packet as a combined call data packet.

By using a call data packet combination manner provided in this embodiment, all call data packets received by the terminal can be maximumly retained, a loss of a call data packet received by the second terminal is reduced, and call quality is improved.

In some embodiments, when the auxiliary link is the point-to-point auxiliary link or the server auxiliary link, the first terminal and the second terminal establish the auxiliary link by using Wi-Fi or cellular data.

In some embodiments, when both the first terminal and the second terminal establish the auxiliary link by using Wi-Fi, the auxiliary link is always used to transmit a call data packet until a call ends after the auxiliary link is established successfully, so as to improve call quality. Alternatively, the auxiliary link may transmit a call data packet in only a process in which call quality is abnormal, so as to avoid unnecessary waste of resources.

In some embodiments, when at least one of the first terminal and the second terminal establishes the auxiliary link by using the cellular data, the auxiliary link is used to transmit a call data packet in only a process in which a call quality exception occurs on the primary link, so as to save cellular data traffic while improving call quality. Alternatively, after the auxiliary link is established successfully, the auxiliary link is always used to transmit a call data packet, so as to ensure call quality as much as possible.

In some embodiments, when both a first SIM card and a second SIM card are installed in the first terminal, if a current call card of the first terminal is the first SIM card, and a movement rate of the first terminal is greater than a rate threshold, the first terminal preferably uses cellular data of the second SIM card in a process of establishing the auxiliary link by using the cellular data.

By using a cellular data selection manner provided in this embodiment, it can be avoided, to some extent, that the primary link and the auxiliary link simultaneously perform cell handover when the terminal makes a call in a high-speed movement process, thereby improving call quality.

In some embodiments, the call data in the second call data packet is a PCM data stream.

In some embodiments, the first terminal further includes a first microphone and a second microphone, and the first terminal is further configured to: collect left channel call data by using the first microphone, and collect right channel call data by using the second microphone; and send the left channel call data and the right channel call data packet to the second terminal, where the left channel call data is played by the second terminal by using a first playing component, and the right channel call data is played by the second terminal by using a second playing component. According to the method provided in this embodiment, a receive end (that is, the second terminal) can play a stereo sound effect, and has relatively good user experience.

For example, the first playing component and the second playing component may belong to a same device. For example, the first playing component may be a left headset, and the second playing component may be a right headset. Alternatively, the first playing component and the second playing component may belong to different devices. For example, the first playing component is a speaker of the receive-end device, and the second playing component is a mono headset connected to the receive-end device.

In some embodiments, that the left channel call data and the right channel call data are sent to the second terminal includes: The left channel call data and the right channel call data are jointly encoded, and jointly encoded call data is sent to the second terminal by using a same auxiliary link; or the left channel call data and the right channel call data are separately encoded and sent to the second terminal by using different auxiliary links.

According to a second aspect, an embodiment provides an auxiliary-link-based call compensation apparatus, applied to a first terminal. The first terminal and a second terminal are connected by using a core network device, and establish a primary link. The apparatus is configured to control the first terminal to perform the following operations: establishing at least one auxiliary link with the second terminal in response to an auxiliary link establishment condition, where the auxiliary link is different from the primary link; and transmitting call data packets with the second terminal by using the primary link and the at least one auxiliary link.

According to a third aspect, an embodiment provides an auxiliary-link-based call compensation method, applied to a first terminal. The first terminal and a second terminal are connected by using a core network device, and establish a primary link. The method includes: establishing at least one auxiliary link to the second terminal in response to an auxiliary link establishment condition, where the auxiliary link is different from the primary link; and transmitting call data packets with the second terminal by using the primary link and the at least one auxiliary link.

According to a fourth aspect, an embodiment provides a chip, applied to a first terminal, where the first terminal establishes a primary link to a second terminal by using a core network device, the chip includes a memory and a processor, and the processor executes a computer program stored in the memory, to control the first terminal to perform the following process: establishing at least one auxiliary link to the second terminal in response to an auxiliary link establishment condition, where the auxiliary link is different from the primary link; transmitting call data packets with the second terminal by using the primary link and the at least one auxiliary link.

It may be understood that, for beneficial effects of the second aspect to the fourth aspect, reference may be made to the related descriptions in the first aspect. Details are not described herein again.

According to a fifth aspect, an embodiment of this application provides an auxiliary link-based communications system, including a first terminal and a second terminal. The first terminal and the second terminal perform OTT communication, and establish a primary link. The first terminal is configured to: establish at least one auxiliary link with the second terminal in response to an auxiliary link establishment condition, where the auxiliary link is different from the primary link; obtain PCM data streams of call data; generate call data packets based on the PCM data streams; and transmit the call data packets with the second terminal by using the primary link and the at least one auxiliary link.

It should be noted that, in a communication process of the system, a bottom-layer PCM data stream obtaining module (for example, a digital signal processor (Analog Device Instrument, ADSP) or an audio recording module (audio record)) may directly obtain PCM data streams of a call, and send the PCM data streams to a communication peer end, without copying and playing a voice packet by using an OTT application layer, so as to reduce impact on an original OTT call link.

According to the system provided in this embodiment, in a process of performing an OTT call (for example, making a WeChat call) between the first terminal and the second terminal, the auxiliary link and the primary link may be used to jointly transmit the call data packet, thereby improving problems such as call discontinuity, no sound, and video frame freezing, and improving call quality.

In some embodiments, the auxiliary link establishment condition is: The first terminal receives a dialing operation entered by a user; or the first terminal displays a ringing interface; or the first terminal receives a call answering operation entered by a user; or the first terminal is currently in an abnormal geographical location; or the first terminal is being handed over from a first abnormal cell to a second abnormal cell; or call quality of the first terminal is abnormal on the primary link; or an encoding format of the call data packet is a preset encoding format on the primary link; or at least one of a sampling rate, an encoding rate, encoding quality, resolution, a frame rate, a quantity of sound channels, or a MOS value of the call data packet is less than a respective corresponding threshold on the primary link, where the abnormal geographical location, the first abnormal cell, and the second abnormal cell are determined by the first terminal based on a historical call process of the first terminal.

In some embodiments, the primary link or the auxiliary link is a point-to-point auxiliary link established according to an IP protocol or a D2D protocol, or a server auxiliary link established according to an IP protocol or a D2D protocol.

According to a sixth aspect, an embodiment of this application further provides an auxiliary link-based communications system, including a first terminal and a second terminal. The first terminal and the second terminal are connected by using Bluetooth, and establish a primary link. The first terminal is configured to: establish at least one auxiliary link with the second terminal in response to an auxiliary link establishment condition, where the auxiliary link is different from the primary link; and transmit data packets with the second terminal by using the primary link and the at least one auxiliary link.

According to the system provided in this embodiment, in a process in which the first terminal and the second terminal perform Bluetooth communication, a call data packet may be jointly transmitted by using the auxiliary link and the primary link. This improves a data transmission rate.

In some embodiments, the auxiliary link establishment condition includes: call quality of the primary link is abnormal; or a Bluetooth signal strength of the first terminal is less than a strength threshold.

In some embodiments, the auxiliary link is a Wi-Fi link or a data service link.

DETAILED DESCRIPTION OF ILLUSTRATIVE EMBODIMENTS

The auxiliary-link-based compensation call method provided in the embodiments of this application is applicable to a voice call process and a video call process, and may be applied to a terminal that can perform a voice call or a video call, such as a mobile phone, a tablet computer, a wearable device, a vehicle-mounted device, a notebook computer, or a netbook. A specific type of the terminal is not limited in embodiments of this application.

It should be understood that the first, the second, and various numbers in this specification are used for differentiation only for ease of description, instead of limiting the scope of this application.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In a call process, the terminal is connected to a core network device by using an access network element, to establish a primary link for the call and perform an operator call. When the terminal makes a call by using technologies such as circuit switched (Circuit Switched, CS), voice over long-term evolution (Voice over Long-Term Evolution, VoLTE), voice over new radio (Voice over New Radio, VoNR), voice over long-term evolution (Video over Long-Term Evolution, ViLTE), voice over new radio (Video over New Radio, ViNR), evolved packet system fallback (Evolved Packet System fallback, EPS fallback), CS fallback (CS fallback), and rich communication suite (Rich Communication Suite, RCS), an access network element on the primary link is a base station. When the terminal makes a call by using a technology such as a voice over wireless fidelity (wireless fidelity, WiFi) (Voice over WiFi, VoWiFi) or a voice over Wi-Fi (Video over WiFi, ViWiFi), the access network element on the primary link is a Wi-Fi device, and the Wi-Fi device includes a Wi-Fi router or a Wi-Fi hotspot device.

Figure 1A:
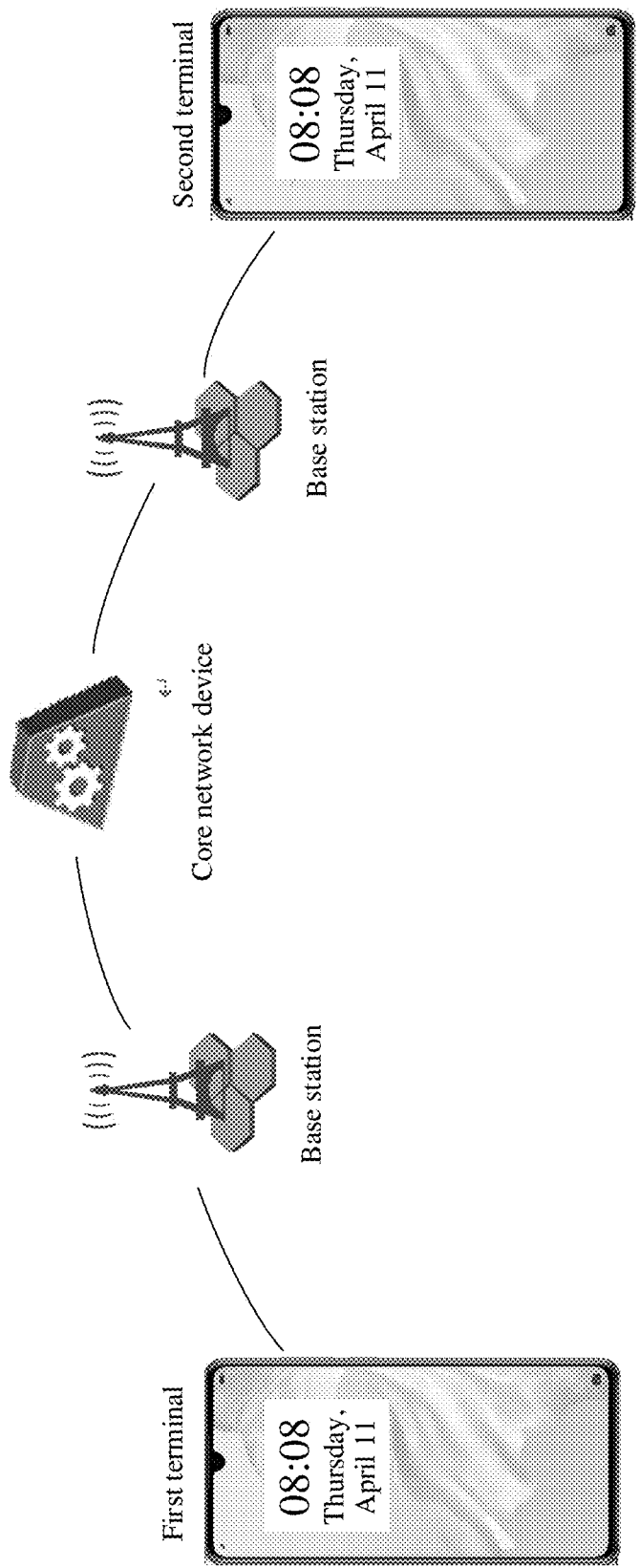
FIG. 1a is a schematic diagram 1 of a primary link according to an embodiment of this application.
Figure 1B:
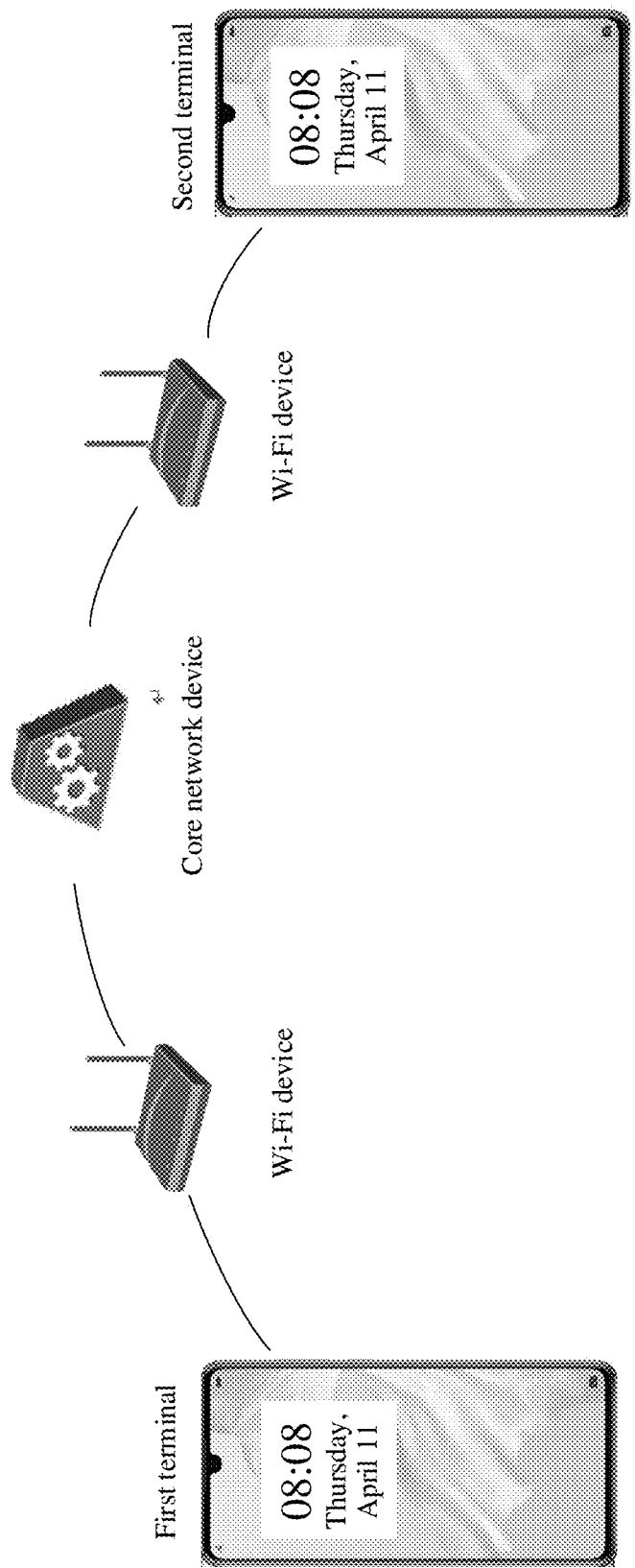
FIG. 1b is a schematic diagram 2 of a primary link according to an embodiment of this application.

For example, referring to a schematic diagram of a primary link shown in FIG. 1a, access network elements that connect the first terminal and the second terminal to the core network device are base stations. Refer to a schematic diagram of a primary link shown in FIG. 1b. Access network elements that connect the first terminal and the second terminal to the core network device is Wi-Fi devices.

It should be noted that, in this embodiment, in a call process, the two terminals may establish a connection to the core network device by using a same communications technology, and the primary link is formed. Alternatively, the two terminals may establish a connection to the core network device by using different communications technologies, and the primary link is formed. For a voice call, the communications technology may be CS, VoLTE, VoNR, VoWiFi, EPS fallback, CS fallback, RCS, or the like. For a video call, the communications technology may be ViLTE, ViWiFi, or the like.

For example, both the first terminal and the second terminal may be connected to the core network device by using VoLTE. Alternatively, the first terminal is connected to the core network device by using VoLTE, and the second terminal is connected to the core network device by using VoNR.

The following describes a process of establishing the primary link. For example, the first terminal and the second terminal may establish the primary link for a call between the two terminals by using the session initiation protocol (Session Initiation Protocol, SIP), and transmit a call data packet by using the primary link, so as to implement the call between the two terminals.

It should be noted that, in this embodiment, when the first terminal is a calling terminal, the second terminal is a called terminal; and when the first terminal is a called terminal, the second terminal is a calling terminal.

Figure 2:
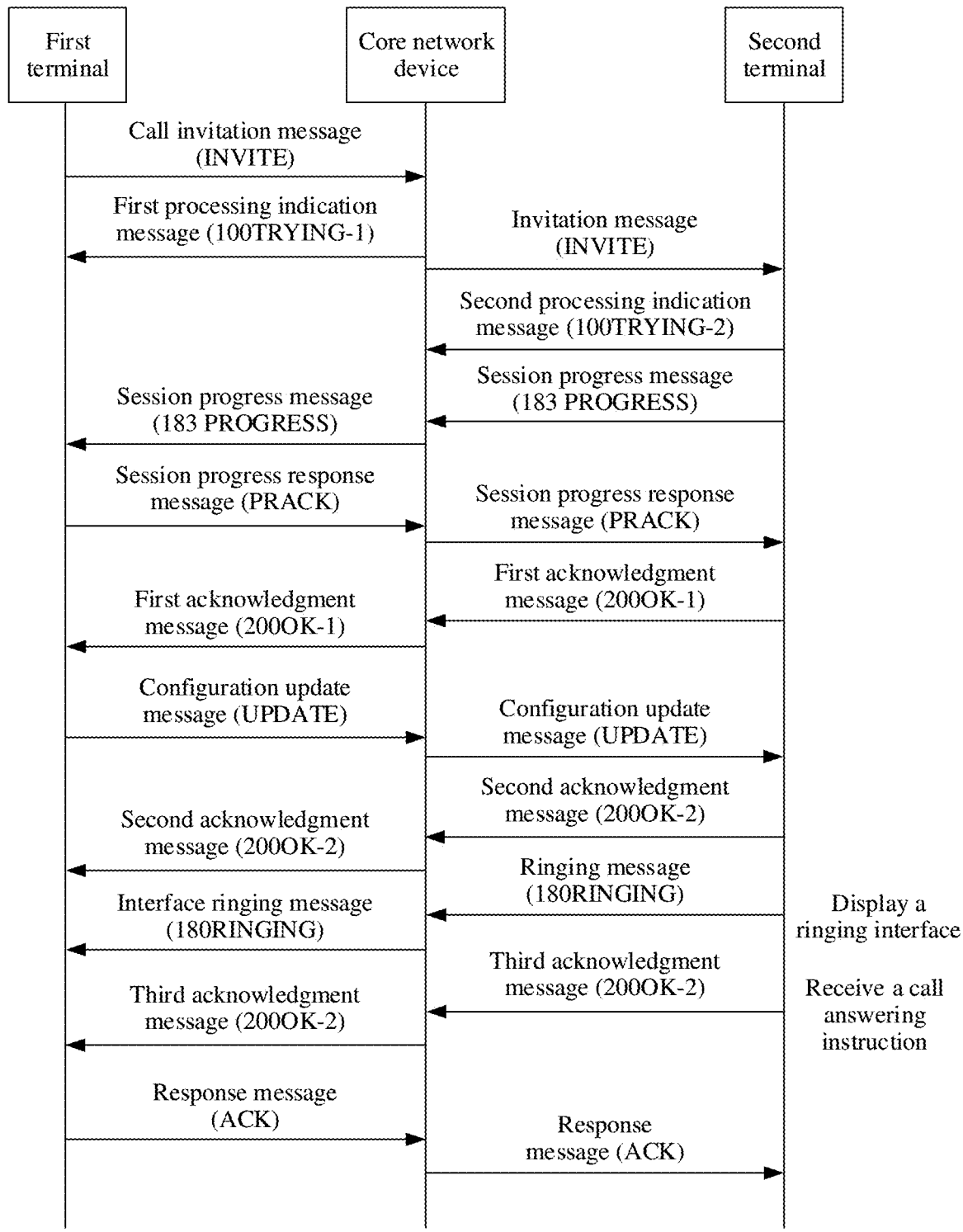
FIG. 2 is a schematic flowchart of establishing a primary link according to an embodiment of this application.

FIG. 2 is a schematic flowchart of establishing a primary link between a first terminal and a second terminal. In FIG. 2, the first terminal is a calling terminal, the second terminal is a called terminal (that is, the first terminal calls the second terminal), and the primary link is established between the first terminal and the second terminal by using SIP. An establishment procedure includes the following content.

(1) The first terminal invites the second terminal to join a session

First, after receiving a dialing operation entered by a user, the first terminal sends a call invitation message (INVITE) to a core network device, to invite the second terminal to join the session. The INVITE includes a phone number of the first terminal and a phone number of the second terminal. After receiving the INVITE, the core network device first sends a first processing indication message (100TRYING-1) to the first terminal, to notify the first terminal that the core network device has received the INVITE and has started processing. Subsequently, after performing user authentication on the first terminal, the core network device sends the INVITE to the second terminal. After receiving the INVITE, the second terminal sends a second processing indication message (100TRYING-2) to the core network device, to notify the core network device that the second terminal has received the INVITE and has started processing.

(2) Establishment of session progress information

First, the second terminal sends a session progress message (183 PROGRESS) to the first terminal by using the core network device, to prompt the first terminal to establish the session progress information. In this case, a quality of service class identifier (Quality of Service Class Identifier, QCI) dedicated bearer of the second terminal is set up, and is a QCI 1.Subsequently, the first terminal sends a session progress response message (PRACK) to the second terminal by using the core network device, to respond to the 183 PROGRESS. In this case, a dedicated bearer of a QCI 1 of the first terminal is set up. Finally, the second terminal sends a first acknowledgment message (200OK-1) to the first terminal by using the core network device, to notify the first terminal that a session progress is established.

(3) The first terminal and the second terminal perform resource reservation configuration First, after completing local resource reservation, the first terminal sends a configuration update message (UPDATE) to the second terminal by using the core network device, to indicate that the first terminal has completed resource reservation. Subsequently, after completing local resource configuration, the second terminal sends a second acknowledgment message (200OK-2) to the first terminal by using the core network device, to indicate that the second terminal has completed resource reservation.

(4) The second terminal displays a ringing interface. After displaying the ringing interface, the second terminal sends a ringing (180 RINGING) message to the first terminal by using the core network device, to indicate that the second terminal rings.

(5) The second terminal receives a call answering operation entered by the user. After receiving the call answering operation, the second terminal sends a third acknowledgment message (200OK-3) to the second terminal by using the core network device, to indicate that the second terminal has answered the call and that the INVITE has been successfully processed. The first terminal sends an answer message to the second terminal by using the core network device, to indicate that the first terminal has learned that the INVITE has been successfully processed.

After the foregoing processes (1) to (5), the primary link for the call between the first terminal and the second terminal is established. In a primary link-based call process, a call data packet collected by the first terminal is first sent by the first terminal to the core network device by using an access network element, and then sent by the core network device to the second terminal by using an access network element. Similarly, the call data packet collected by the second terminal is first sent by the second terminal to the core network device by using the access network element, and then sent by the core network device to the second terminal by using the access network element.

It should be noted that, in this embodiment, the call between the first terminal and the second terminal may be a voice call, or may be a video call. If the first terminal and the second terminal perform the voice call, the call data packet is a voice data packet. If the first terminal and the second terminal perform the video call, the call data packet includes both a video data packet and a voice data packet.

During a call, network signals may be weak or even fail to be received due to poor network distribution, mutual interference between a plurality of networks, building blocking, or base station or core network device faults. Therefore, a large quantity of call data packets in a call link may be lost, a delay may be excessively long, or a jitter may be excessively large, resulting in problems such as voice discontinuity, no sound, or even call dropping.

Figure 3:
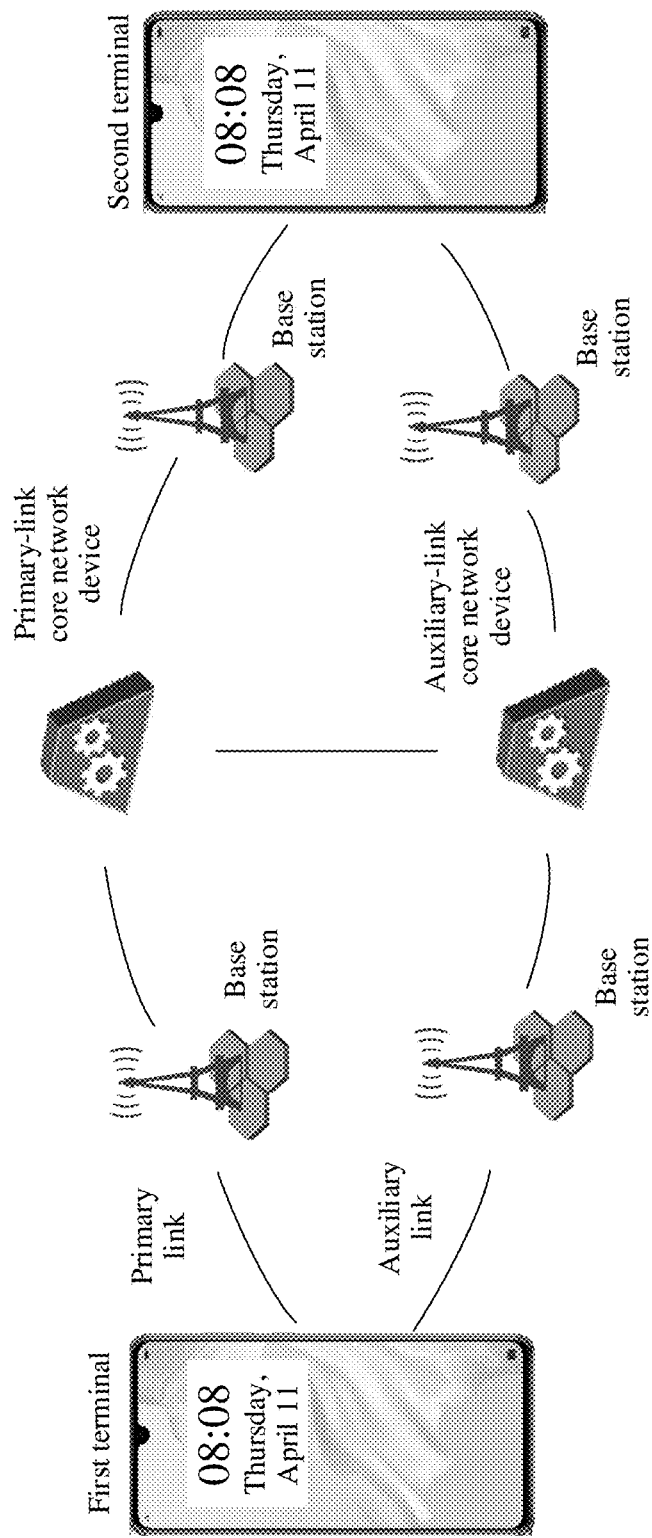
FIG. 3 is a schematic diagram 1 of a call link according to an embodiment of this application.

For the foregoing problem, referring to FIG. 3, a possible solution is that in a call process of the terminal, the core network device on the primary link monitors call quality of the primary link. If the call quality is poor, the core network device on the primary link controls another core network device to establish an auxiliary link between the two terminals. After the dual links are established, the core network device on the primary link always monitors uplink/downlink call quality of all links, so as to determine which link or which two links are used, combine call data packets on the two links, and then send a combined data packet to a terminal on the other side.

However, in the foregoing process, when the core network device on the primary link is faulty, or a service processing capability is reduced (for example, when a large quantity of call services need to be maintained during peak hours of a call service, for example, 10:00 to 11:00 in the morning and 17:00 to 18:00 in the afternoon), the core network device on the primary link may not be able to effectively manage the two channels and maintain a call in time, resulting in a relatively long call delay or even call dropping.

Therefore, this application provides another auxiliary-link-based call compensation method. In a call process of the primary link, at least one auxiliary link different from the primary link is used to simultaneously transmit call data packets, so as to reduce dependency of the call process on a core network device or a base station, and improve call quality.

Figure 4:
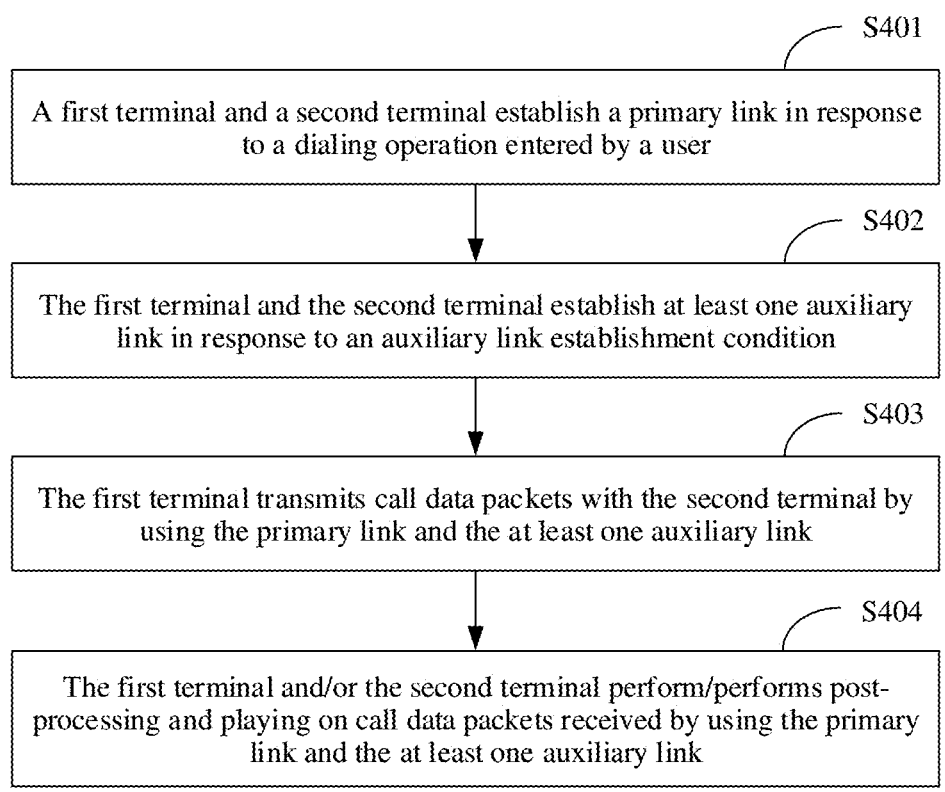
FIG. 4 is a schematic flowchart of an auxiliary-link-based call compensation method according to an embodiment of this application.

FIG. 4 is a flowchart of an auxiliary-link-based call compensation method according to this application. The method includes the following steps S401 to S404.

S401: A first terminal and a second terminal establish a primary link in response to a dialing operation entered by a user.

In this embodiment, the primary link is a call link established by the first terminal and the second terminal through a core network device and an access network element. For example, the primary link may be the foregoing core network link based on the base station, or the core network link based on the Wi-Fi device. For a specific establishment process, refer to related descriptions in FIG. 2. Details are not described again in this embodiment.

S402: The first terminal and the second terminal establish at least one auxiliary link in response to an auxiliary link establishment condition.

In this embodiment, both the first terminal and the second terminal may start to establish an auxiliary link between the first terminal and the second terminal after detecting the auxiliary link establishment condition.

In this embodiment, the auxiliary link may be a point-to-point auxiliary link, a server auxiliary link, a core network link based on the base station, or a core network link based on the Wi-Fi device. In this embodiment, both the point-to-point auxiliary link and the server auxiliary link are links established by the first terminal and the second terminal according to an internet protocol (Internet Protocol, IP). Optionally, the IP protocol may be IPv4 or IPv6.

The point-to-point auxiliary link or the server auxiliary link can be used to reduce dependency of a call process on the access network element or the core network device. Even if the access network element or the core network device is abnormal during the call process, current call quality of the terminal can be improved to some extent. The core network link based on the base station or the core network link based on the Wi-Fi device is used as the auxiliary link, so that existing resources can be fully utilized.

It should be noted that the primary link and the auxiliary link are different links. For example, when the primary link is the core network link based on the base station, the auxiliary link may be at least one of the point-to-point auxiliary link, the server auxiliary link, or the core network link based on the Wi-Fi device. When the primary link is the core network link based on the Wi-Fi device, the auxiliary link may be at least one of the point-to-point auxiliary link, the server auxiliary link, or the core network link based on the base station.

Figure 5:
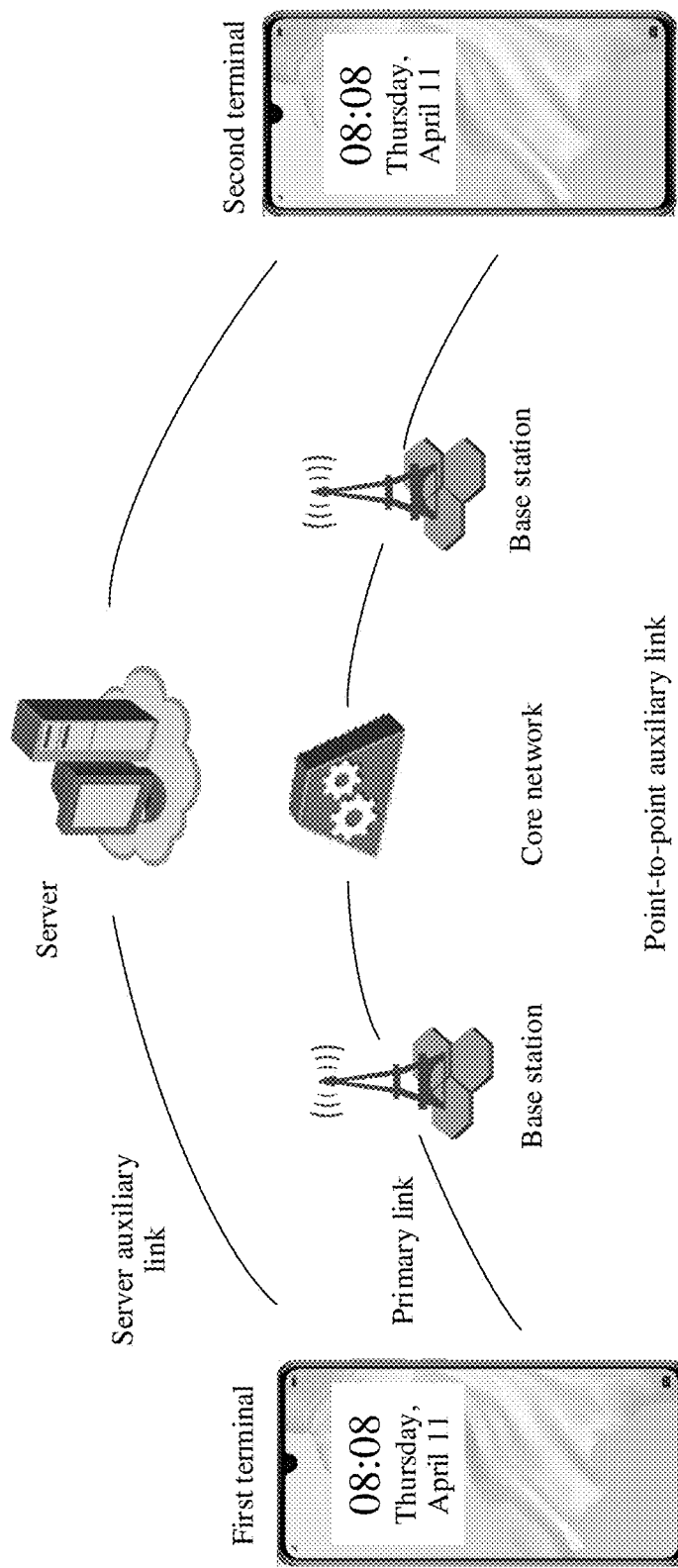
FIG. 5 is a schematic diagram 2 of a call link according to an embodiment of this application.

For example, FIG. 5 is a schematic diagram of the call link between the first terminal and the second terminal. The primary link is the core network link based on the base station, and the auxiliary link includes the point-to-point auxiliary link and the server auxiliary link. Both the primary link and the auxiliary link can transmit call data packets between the first terminal and the second terminal.

It should be noted that, in this embodiment, when the first terminal is a calling terminal, the second terminal is a called terminal; or when the first terminal is a called terminal, the second terminal is a calling terminal.

S403: The first terminal transmits call data packets with the second terminal by using the primary link and the at least one auxiliary link.

In a process in which the primary link and the auxiliary link work at the same time, the call data packets transmitted by the primary link and the auxiliary link may be completely the same, may be completely different, or may be partially the same. However, a sum of call data packets transmitted on the primary link and all auxiliary links includes all call data packets collected by the first terminal and/or the second terminal.

In this embodiment, a data transmission mode of the primary link or the auxiliary link may be a unidirectional transmission mode, or may be a bidirectional transmission mode. The unidirectional transmission mode means that the primary link or the auxiliary link is only used to transmit the call data packet sent by the first terminal to the second terminal, or is only used to transmit the call data packet sent by the second terminal to the first terminal. The bidirectional transmission mode means that the primary link or the auxiliary link may be used to transmit the call data packet sent by the first terminal to the second terminal, and may also be used to transmit the call data packet sent by the second terminal to the first terminal.

For example, when only data transmission from the second terminal to the first terminal is abnormal on the primary link, the auxiliary link may be in the unidirectional transmission mode, and used by the second terminal to send the call data packet to the first terminal. Alternatively, when only data transmission from the first terminal to the second terminal is abnormal on the primary link, the auxiliary link may be in the unidirectional transmission mode, and used by the first terminal to send the call data packet to the second terminal. This method can not only improve call quality, but also reduce resource overheads of the terminal.

Certainly, in a call process, the call data packets may alternatively be transmitted on the primary link and the auxiliary link by using the unidirectional transmission mode and the bidirectional transmission mode together. For example, the primary link transmits the call data packets in the bidirectional transmission mode, and the auxiliary link transmits the call data packets in the unidirectional transmission mode.

It should be noted that, regardless of which data transmission mode is used by the primary link and the auxiliary link, the sum of call data packets transmitted by the primary link and the auxiliary link includes all call data packets collected by the first terminal and the second terminal.

S404: The first terminal and/or the second terminal performs post-processing and playing on call data packets received by using the primary link and the at least one auxiliary link.

After receiving the call data packets, the first terminal or the second terminal needs to perform post-processing and playing on the call data packets, where the post-processing includes combining, deduplicating, and sorting the call data packets.

The following describes a process of establishing the auxiliary link in this application.

First, auxiliary link establishment conditions are described, which may be classified into the following three types: (1) A terminal establishes an auxiliary link in advance. (2) The terminal establishes an auxiliary link when predicting that a call may be abnormal. (3) After detecting that the call quality is poor, the terminal establishes an auxiliary link.

(1) The terminal establishes the auxiliary link in advance.

Strengths of network signals may vary in different areas. Therefore, if the terminal makes a call in a moving process, voice discontinuity, no sound, video image freezing, and the like may occur in the call process due to a location change. For example, after the terminal enters an elevator car in the call process, a problem of call voice discontinuity suddenly occurs. Therefore, in a possible implementation, the first terminal and the second terminal may establish the auxiliary link in advance, so as to enable the auxiliary link at any time when call quality is abnormal, thereby quickly improving call quality.

Figure 6:
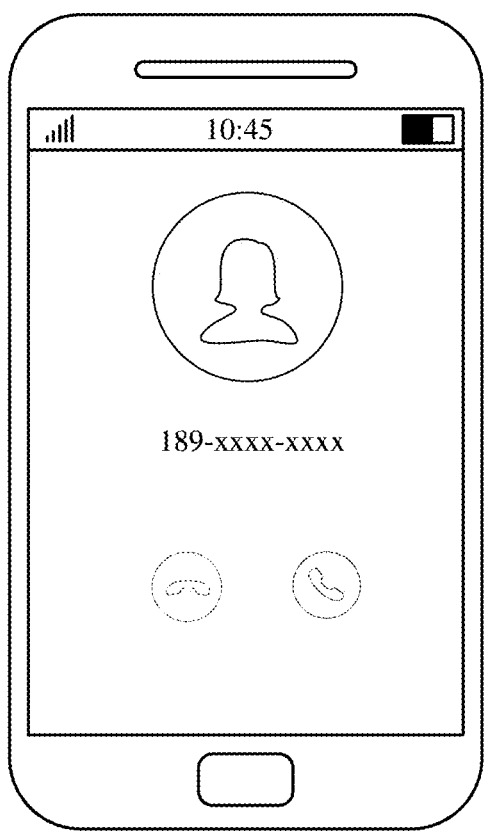
FIG. 6 is a schematic diagram of a terminal ringing interface according to an embodiment of this application.

In some embodiments, the auxiliary link establishment condition may be that the first terminal or the second terminal detects feature information in a process of establishing the primary link. For example, referring to the flowchart of establishing the primary link shown in FIG. 2, the calling terminal may start to establish the auxiliary link after sending the INVITE. Alternatively, the called terminal may start to establish the auxiliary link after displaying the ringing interface. For example, the ringing interface may be shown in FIG. 6.

Figure 7:
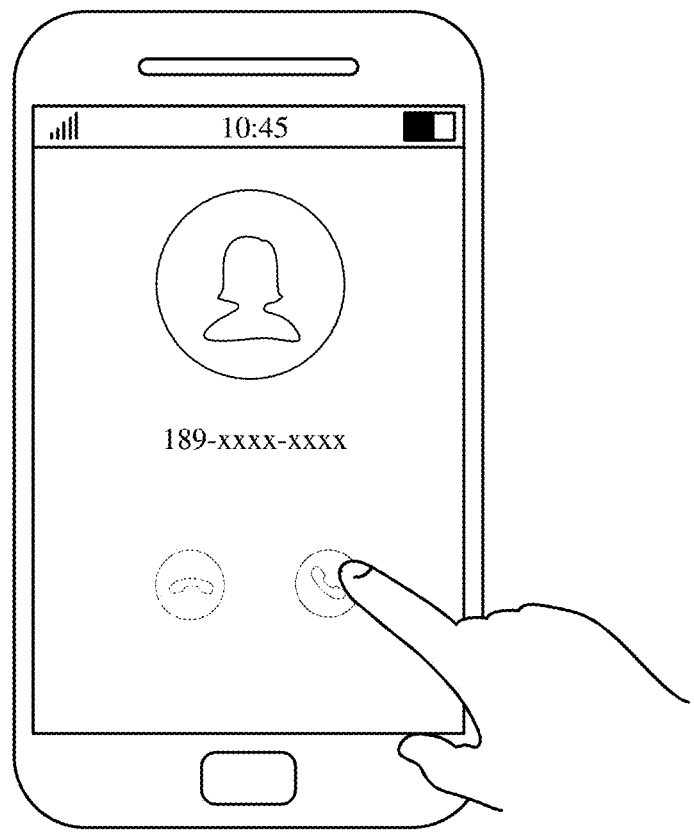
FIG. 7 is a schematic diagram of a scenario in which a user answers a call according to an embodiment of this application.

In some other embodiments, the auxiliary link establishment condition may be that the calling terminal or the called terminal receives a user operation. For example, the calling terminal may establish the primary link and the auxiliary link at the same time after detecting a dialing operation entered by the user. Alternatively, referring to FIG. 7, the called terminal may start to establish the auxiliary link after detecting a call answering operation entered by the user.

In some other embodiments, the calling terminal and the called terminal may alternatively establish the auxiliary link at a preset time after the primary link is established. The preset time is pre-configured, for example, the second second, the third second, or the fifth second. This is not limited in this embodiment.

(2) The terminal establishes the auxiliary link when predicting that the call may be abnormal.

In a daily call process, the terminal may determine, by detecting call quality, scenarios in which call quality exceptions often occur, and store exception indication information corresponding to these scenarios. For example, a geographical location in which a call exception often occurs is determined as an abnormal geographical location, or in a cell handover process in which call quality exceptions often occurs, a cell before handover is determined as a first abnormal cell, and a cell after handover is determined as a second abnormal cell.

Therefore, in some embodiments, the auxiliary link establishment condition may be: The first terminal is currently in the abnormal geographical location, or the first terminal is being handed over from the first abnormal cell to the second abnormal cell.

When the first terminal detects, in the call process, that the current location information is an abnormal geographical location, or the first terminal is handed over from the first abnormal cell to the second abnormal cell, it is considered that an exception may occur in the call, and the auxiliary link starts to be established to improve call quality.

(3) The terminal establishes the auxiliary link after detecting that the call quality is abnormal.

To save resource overheads of the terminal (for example, to avoid that the auxiliary link is not put into use after being established), the calling terminal and the called terminal may alternatively start to establish the auxiliary link after detecting that the call quality is abnormal.

Therefore, in some embodiments, the auxiliary link establishment condition may be that the calling terminal or the called terminal detects the call quality exception. The call quality exception includes an uplink call quality exception and/or a downlink call quality exception.

Specifically, in a call process, the calling terminal and the called terminal may continuously detect call quality of the primary link. When the terminal on either side detects that the call quality on the primary link is abnormal, the auxiliary link is established.

Call quality includes uplink call quality and downlink call quality. The uplink call quality includes uplink quality and/or uplink data packet transmission quality. The downlink call quality includes downlink quality and/or downlink data packet transmission quality. In this embodiment, the uplink call data packet is a call data packet sent by the terminal to the core network device by using the access network element, and the downlink call data packet is a call data packet sent by the core network device to the terminal by using the access network element.

The uplink quality of the terminal may be determined based on at least one of an uplink air interface transmission rate of the primary link, terminal signal transmit power, a media access control (Media Access Control, MAC) layer bit error status, a congestion status of packet data convergence protocol (Packet Data Convergence Protocol, PDCP) uplink data, a data traffic control status, an uplink scheduling and grant status, a buffer time, an out-of-synchronization status, a radio resource control (Radio Resource Control, RRC) release, establishment, reestablishment, and a handover status, and a tracking area update (Tracking Area Update, TAU) result, an uplink signal quality parameter. Signal quality parameters include at least one of a reference signal strength (Reference Signal Receiving Power, RSRP), reference signal quality (Reference Signal Receiving Quality, RSRQ), or a signal-to-noise ratio (signal to interference plus noise ratio, SINR). When the air interface transmission rate is determined, impact of an interference factor needs to be considered. The jitter of call data packets refers to a difference between a receiving timestamp and a sending timestamp of adjacent data packets. The uplink data packet transmission quality may be determined based on parameters such as a packet loss rate of an uplink call data packet, a quantity of lost packets within a preset time, a delay, and a jitter.

The first terminal and/or the second terminal may determine, based on uplink/downlink quality of the primary link and/or uplink/downlink data packet transmission quality, whether call quality of the primary link is abnormal. For example, when the uplink air interface transmission rate is less than a rate threshold, the terminal determines that uplink call quality of the terminal is abnormal. Alternatively, when the packet loss rate of an uplink call data packet is greater than a packet loss rate threshold, the terminal determines that uplink call quality of the terminal is abnormal. Alternatively, when the terminal transmits a signal at full power, the uplink air interface transmission rate is less than the rate threshold, the packet loss rate is greater than the packet loss rate threshold, and the signal-to-noise ratio is less than a signal-to-noise ratio threshold, the terminal determines that call quality of the terminal is abnormal.

The downlink quality of the primary link of the terminal may be determined based on at least one of parameters such as an out-of-synchronization status, an RRC release, establishment, reestablishment, and a handover status, a TAU result, and downlink signal quality. The downlink data packet transmission quality may be determined based on parameters such as a packet loss rate of a downlink call data packet, a quantity of lost packets within a preset time, a delay, and a jitter.

For example, when the packet loss rate of the downlink call data packet is greater than the packet loss rate threshold, the terminal determines that downlink call quality of the terminal is abnormal. Alternatively, when the packet loss rate of the downlink call data packet is greater than the packet loss rate threshold, a delay is greater than a delay threshold, and a signal-to-noise ratio is less than the signal-to-noise ratio threshold, the terminal determines that downlink call quality of the terminal is abnormal.

In this embodiment, the rate threshold, the packet loss rate threshold, the delay threshold, the jitter time threshold, the signal-to-noise ratio threshold, and the like are pre-configured, and are not limited in this embodiment. For example, the rate threshold may be 10 kb/s, 20 kb/s, or the like; the packet loss rate threshold may be 5%, 10%, or the like; the delay threshold may be 100 ms, 120 ms, or the like; and the signal-to-noise ratio threshold may be 3 decibels (dB), 10 dB, or the like.

In addition, during a call between the first terminal and the second terminal, the first terminal and the second terminal may periodically receive a downlink call quality detection result of the peer end. If the result indicates that the downlink voice quality of the peer end is abnormal, the auxiliary link is established.

Optionally, in a call process, the first terminal and/or the second terminal may further detect an encoding format of the call data packet. When the encoding format is a first encoding format, it is also considered that quality of the current call is abnormal, and the auxiliary link needs to be established, so as to transmit the call data packet in a second encoding format by using the auxiliary link. The first encoding format may be a voice encoding format with relatively low encoding quality, such as adaptive multi-rate narrowband (Adaptive Multi Rate-Narrow Band, AMR-NB), or a video encoding format with relatively low encoding quality, such as H264. The second coding format is a voice encoding format with relatively high coding quality, such as pulse code modulation (Pulse Code Modulation, PCM), Opus, adaptive multi-rate wideband (adaptive multi rate-narrow band, AMR-WB), enhanced voice services (enhance voice services, EVS), and EVS Codec extension for immersive voice and audio services (EVS Codec Extension for Immersive Voice and Audio Services, IVAS), or a video encoding format with relatively high coding quality, such as H265 and H266.

In this embodiment, at a receive end (the first terminal or the second terminal), both a call data packet with low encoding quality and a call data packet with high encoding quality may be received. The receive end may choose to output the audio and video data based on the call data packet with the high encoding quality, or may choose to perform fusion processing on the call data packet with the low encoding quality and the call data packet with the high coding quality, and output the audio and video data based on the call data packet obtained after the fusion processing, thereby improving call quality between the first terminal and the second terminal.

Optionally, the first terminal and/or the second terminal may further detect a sampling rate, an encoding rate, encoding quality, resolution, a quantity of sound channels or a frame rate, or a mean opinion score (Mean Opinion Score, MOS) of call data on the primary link. When at least one of these parameters does not meet a respective corresponding threshold, it is also considered that the current call quality is abnormal, and the auxiliary link needs to be established, so as to transmit call data with a higher sampling rate, a higher encoding rate, higher encoding quality, a higher resolution, a higher frame rate, a large quantity of sound channels, or a large MOS value by using the auxiliary link, thereby improving call quality between the first terminal and the second terminal. For example, a threshold of the sampling rate may be 16 kHz, a threshold of the encoding rate may be 12.65 kbps, a threshold of the resolution may be 720P, a threshold of the frame rate may be 22 fps, a threshold of the quantity of sound channels may be 2, and a threshold of the MOS value may be 3.5. Specific values of these thresholds are not limited in this embodiment.

The following describes a process of establishing the auxiliary link in this application.

In this embodiment, the auxiliary link may be the point-to-point auxiliary link, the server auxiliary link, the core network link based on the base station, or the core network link based on the Wi-Fi device. For a specific process of establishing the core network link based on the base station or the core network link based on the Wi-Fi device, refer to the link establishment flowchart shown in FIG. 2. Details are not described herein in this embodiment.

The core network link based on the base station may be a call link such as VoLTE, VoNR, ViLTE, ViNR, EPS fallback, CS fallback or RCS, and the core network link based on the Wi-Fi device may be a call link such as VoWiFi or ViWiFi. Based on this, it should be understood that, in this embodiment, when the first terminal and the second terminal use the base station as an access network element to perform a CS, VoLTE, VoNR, ViLTE, ViNR, EPS fallback, CS fallback call, an RCS call, or the like, a Wi-Fi device may be further used as an access network element to establish a VoWiFi or ViWiFi auxiliary link. Similarly, when the first terminal and the second terminal use the Wi-Fi device as the access network element to perform a VoWiFi or ViWiFi call, the base station may also be used as the access network element to establish a CS, VoLTE, VoNR, ViLTE, ViNR, EPS fallback, CS fallback auxiliary link or an RCS auxiliary link, so as to improve call quality.

The point-to-point auxiliary link and the server auxiliary link are established according to the IP protocol or the device to device (Device to Device, D2D) protocol, and are used to transmit a call data packet through the internet. The point-to-point auxiliary link is used to perform direct transmission of the call data packet between the first terminal and the second terminal, and the server auxiliary link is used to forward the call data packet between the first terminal and the second terminal by using the server.

The following separately describes processes of establishing the point-to-point auxiliary link and the server auxiliary link.

Figure 8:
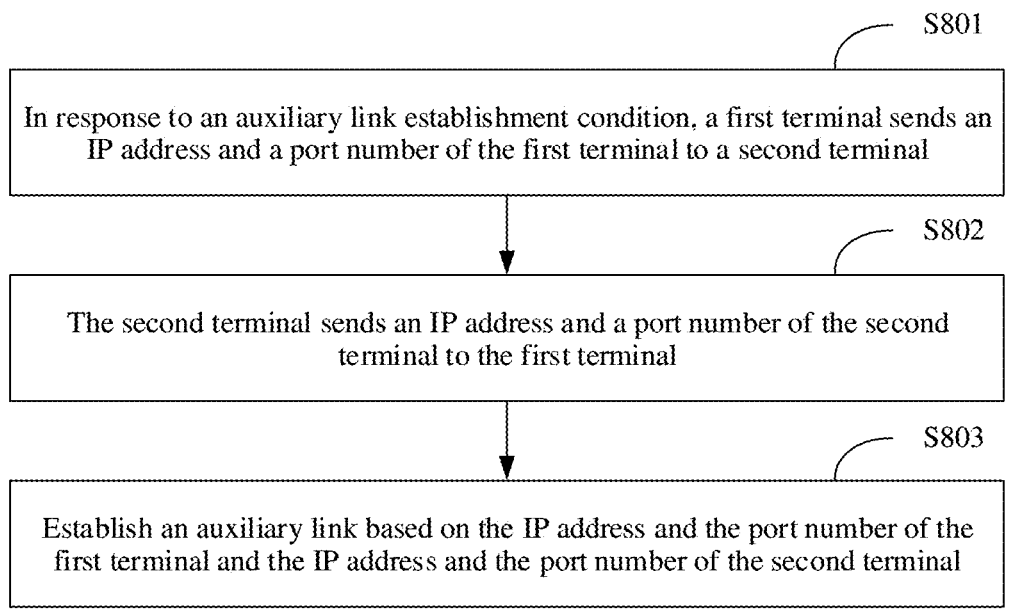
FIG. 8 is a schematic flowchart 1 of establishing an auxiliary link according to an embodiment of this application.

FIG. 8 is a schematic flowchart of establishing a point-to-point auxiliary link according to this embodiment, including the following steps S801 to S803.

S801: In response to an auxiliary link establishment condition, a first terminal sends an IP address and a port number of the first terminal to a second terminal.

In a call process, a terminal usually uses a real-time transport protocol (Real-time Transport Protocol, RTP) and a real-time transport control protocol (Real-time Control Protocol, RTCP).

During a call, the terminal transmits multimedia data packets (such as call data packets) through RTP, monitors the call quality through RTCP, and transmits information about participants in the call. Through RTCP, the terminal can periodically send RTCP packets to other participants (such as the peer end and core network device) of the session to feed back the current call quality. Content carried in the RTCP packet maybe determined based on a pre-configuration, for example, may carry a quantity of data packets sent by the terminal, a quantity of lost data packets, or a jitter condition of the data packets. Certainly, the RTCP packet may also include parameters required by other sessions.

Therefore, in a possible implementation, after detecting the auxiliary link establishment condition, the first terminal may write the IP address and the port number of the local end into the RTCP packet of the current call link (that is, the primary link) of the terminal, and send the RTCP packet to the peer end.

Figure 9:
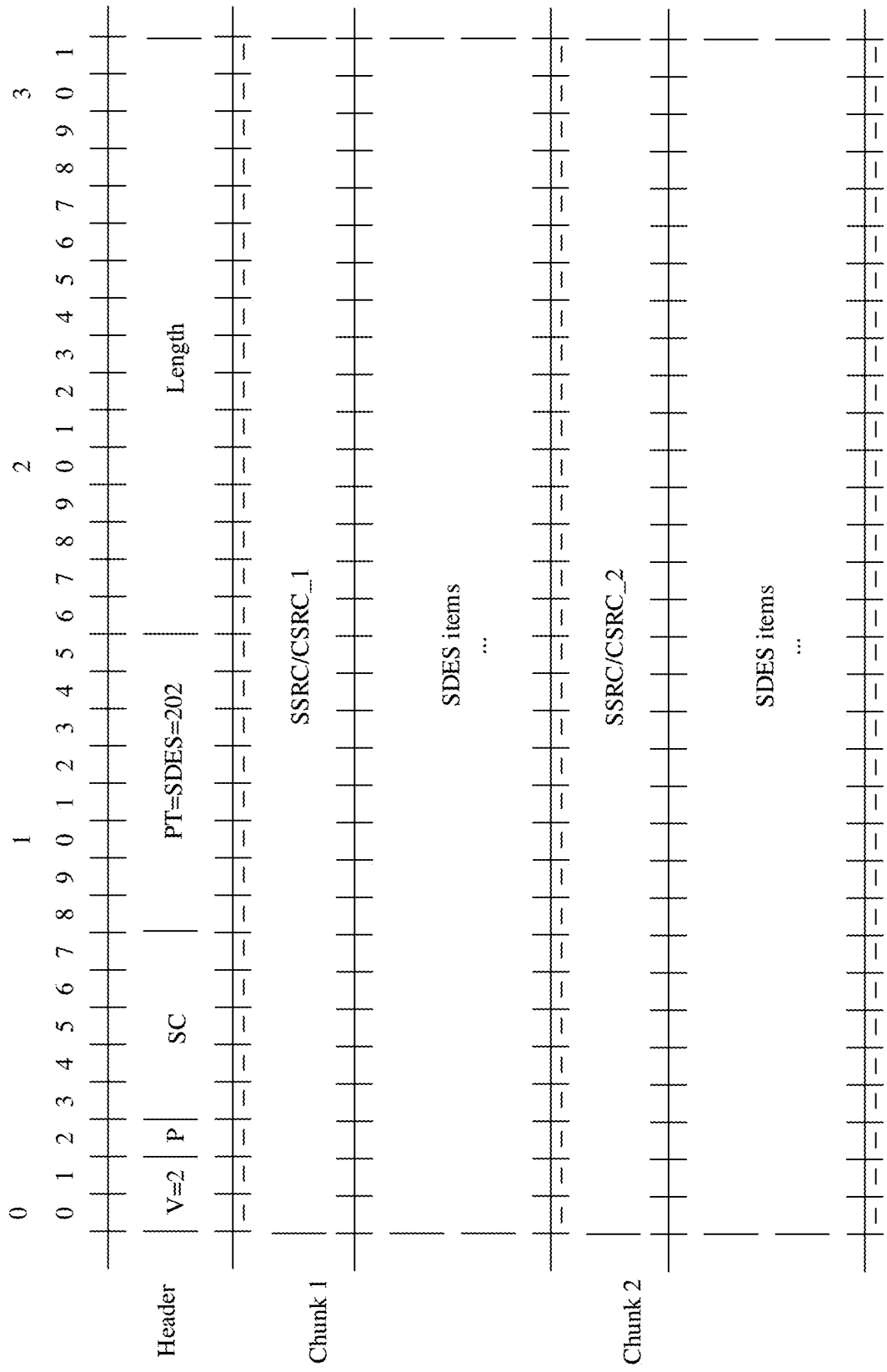
FIG. 9 is a schematic diagram of a structure of an RTCP packet according to an embodiment of this application.

RTCP defines a plurality of types of RTCP packets to transmit different control information, including source description items (Source Description Items, SDES) packets. SDES packets are used to describe a source that sends RTCP packets. FIG. 9 is a schematic diagram of a structure of an SDES packet. The SDES packet includes a header (header) and zero or more report chunks (chunk).

The header sequentially includes RTP and RTCP version numbers (Version, V), a quantity of padding bits (Padding, P), a quantity of source counts (Source Count, SC), a packet type (Packet Type, PT), and a packet length (length). For example, in the SDES packet shown in FIG. 9, V=2, P=1, SC=5, PT=SDES=202, and length=16.

The report block includes a synchronous source/contributing source (Synchronization source/Contributing source, SSRC/CSRC) identifier (identifier), and zero or more source description items (Item). The source description items carry information about the SSRC/CSRC. The source description items further include a plurality of types, for example, a canonical name (Canonical Name, CNAME) source description item, a user name source description item, an email address source description item, a phone number source description item, a user address location source description item, a tool source description item, a notification/status source description item, and a private extended source description item.

Figure 10:
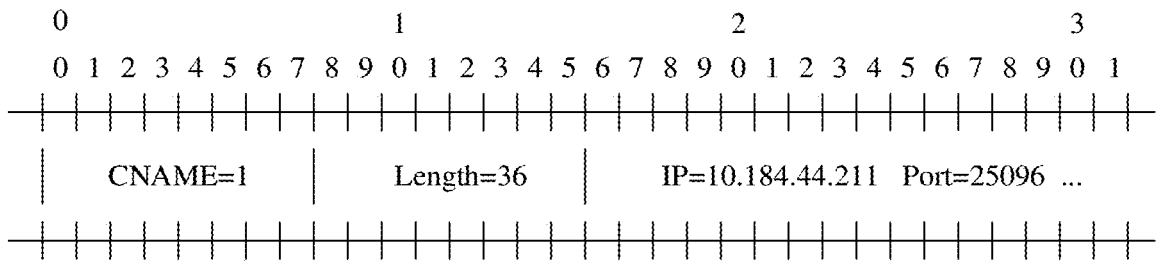
FIG. 10 is a schematic diagram of a structure of source description items according to an embodiment of this application.

The first terminal may write the IP address and the port number of the first terminal into any one of the foregoing source description items. For example, the first terminal writes the IP address and the port number into the CNAME source description item. When the IP address of the first terminal is 10.184.44.211 and the port number is 25096, a structure of the CNAME source description item may be, for example, as shown in FIG. 10, carrying the foregoing IP address and port number.

S802: The second terminal sends an IP address and a port number of the second terminal to the first terminal.

In a possible implementation, after receiving the IP address and the port number of the first terminal, the second terminal writes the IP address and the port number of the second terminal into an RTCP packet sent by the second terminal, and sends the RTCP packet to the first terminal. For a specific manner, refer to a manner of sending the IP address and the port number of the first terminal in step S801. Details are not described herein again in this embodiment.

In another possible implementation, the second terminal may also actively detect the auxiliary link establishing condition, and after detecting the auxiliary link establishing condition, actively write the IP address and the port number of the second terminal into the RTCP packet sent by the second terminal, and send the RTCP packet to the first terminal.

S803: Establish an auxiliary link based on the IP address and the port number of the first terminal and the IP address and the port number of the second terminal.

After receiving the IP address and the port number of the second terminal, the first terminal sends a second link detection command to the second terminal, so as to detect whether the IP address and the port number of the second terminal can be used to successfully receive the message. Similarly, after receiving the IP address and the port number of the first terminal, the second terminal sends a first link detection command to the first terminal, so as to detect whether the IP address and the port number of the first terminal can be used to successfully receive the message.

If the first terminal can receive a second response message that is about a second detection command and returned by the second terminal, and the second terminal can also receive a first response message that is about a first detection command and returned by the first terminal, it indicates that the point-to-point auxiliary link is smooth, and the auxiliary link is successfully established.

In some embodiments, the point-to-point auxiliary link is in a unidirectional transmission mode. Therefore, in a process of establishing the point-to-point auxiliary link, the first terminal and the second terminal may send only an IP address and a port number of a terminal used to receive a call data packet on the auxiliary link to a transmit end of the call data packet. The transmit end performs unidirectional link detection based on the IP address and port number, and the point-to-point auxiliary link is established.

For example, when the point-to-point auxiliary link is only used to send a call data packet from the first terminal to the second terminal, the second terminal may send only the IP address and the port number of the second terminal to the first terminal, and the first terminal completes link detection based on the IP address and the port number, so that the point-to-point auxiliary link is established.

Alternatively, when the point-to-point auxiliary link is only used to send a call data packet from the second terminal to the first terminal, the first terminal may send only the IP address and the port number of the first terminal to the second terminal, and the second terminal completes link detection based on the IP address and the port number, so that the point-to-point auxiliary link is established.

Optionally, the first terminal and the second terminal may not establish the point-to-point auxiliary link through negotiation based on the primary link, but through negotiation by using the server. After the negotiation succeeds by using the server, point-to-point communication based on Wi-Fi or a data service is performed. The method does not increase data transmission pressure of the primary link, avoids affecting call quality in the process of establishing the auxiliary link, and has relatively good user experience.

After the point-to-point auxiliary link is successfully established, the first terminal and the second terminal may communicate by using any one of the following four client/server (Client/Server, C/S) modes.

(1) The first terminal serves as a client, and the second terminal serves as a server. In mode (1), the first terminal first sends the call data packet to the second terminal, and after receiving the call data packet sent by the first terminal, the second terminal starts to send the call data packet to the second terminal.

(2) The second terminal serves as a client, and the first terminal serves as a server. In mode (2), the second terminal first sends the call data packet to the first terminal, and after receiving the call data packet sent by the second terminal, the first terminal starts to send the call data packet to the first terminal.

(3) The first terminal and the second terminal serve as both a client and a server. In mode (3), the auxiliary link includes two sublinks. One sublink is used to send the call data packet of the first terminal to the second terminal, and the other sublink is used to send the call data packet of the second terminal to the first terminal. In mode (3), the first terminal and the second terminal can isolate receiving and sending of the call data packet.

(4) The first terminal and the second terminal serve as clients at the same time. In mode (4), the first terminal and the second terminal simultaneously receive and send a call data packet by using one sublink.

In the point-to-point auxiliary link, the terminal may transmit the call data packet by using a user datagram protocol (User Datagram Protocol, UDP) or a transmission control protocol (Transmission Control Protocol, TCP). According to the UDP or TCP, the terminal may directly send the call data packet to the target terminal based on the IP address and the port number of the peer end.

Because the UDP protocol cannot ensure that a transmitted call data packet can definitely be delivered, in a possible implementation, an important call data packet may be retransmitted and acknowledged to avoid loss of the important call data packet. For example, for the call data packets collected by the first terminal in a call quality abnormal state, to ensure that the call data packets are delivered to the second terminal, the first terminal may redundantly send these call data packets for a plurality of times, and stop redundant sending after receiving response messages that are about these call data packets and that are returned by the second terminal. When the call quality is normal, the data packets are not retransmitted or acknowledged.

In addition, when the primary link of the terminal does not use the RTP/RTCP technology to make a call, or when two terminals are located in different gateways or affected by firewall settings, the terminals may not be able to access each other based on the IP address and port number of each other. In this case, the terminal may use a network address translation (Network Address Translators) NAT technology, so that the IP address and the port number of the terminal can be accessed by the other party. Alternatively, the NAT technology is used to translate the IP address and the port number of the terminal into the IP address and the port number that can be accessed by the other party, so that the two terminals can be connected successfully.

Figure 11:
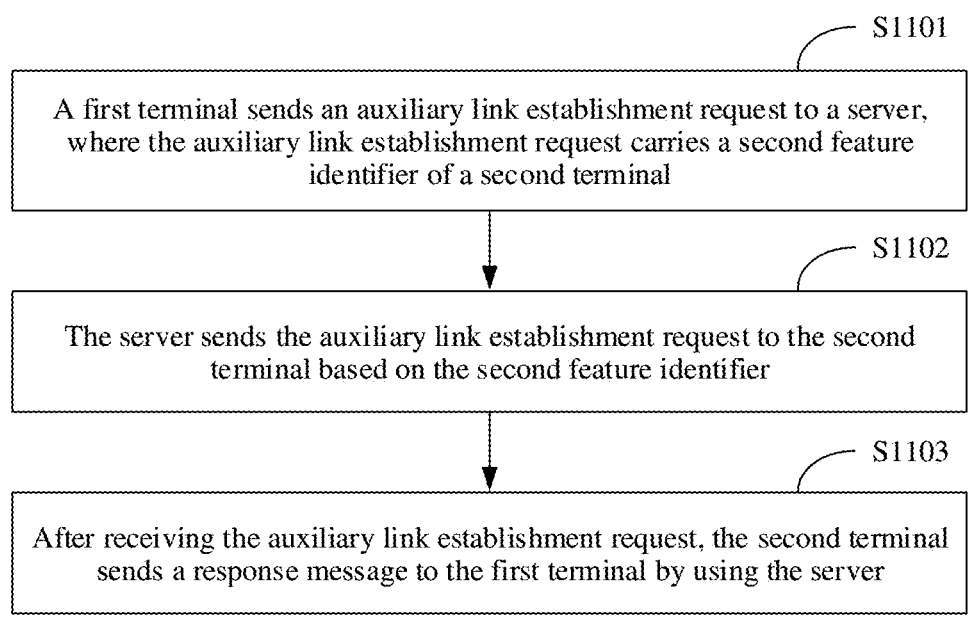
FIG. 11 is a schematic flowchart 2 of establishing an auxiliary link according to an embodiment of this application.

FIG. 11 is a schematic flowchart of establishing a server auxiliary link according to this embodiment, including the following steps S1101 to S1103.

S1101: A first terminal sends an auxiliary link establishment request to a server, where the auxiliary link establishment request carries a second feature identifier of a second terminal.

In this embodiment, the first terminal and the second terminal register with a same server. The auxiliary link establishment request is used to request the second terminal to establish the auxiliary link by using the server, so as to transmit a call data packet in relay mode by using the server.

When carrying a second feature identifier of the second terminal, the auxiliary link establishment request usually further carries a first feature identifier of the first terminal. The first feature identifier is used to uniquely indicate the first terminal, and the second feature identifier is used to uniquely indicate the second terminal. The first feature identifier and the second feature identifier may be an account automatically allocated by the server when the terminal registers with the server, and the account is in a one-to-one correspondence with a registration phone number of the server. Alternatively, the first feature identifier is the registered phone number of the server.

For example, the first terminal is a calling terminal. When the calling terminal establishes the auxiliary link, the phone has been dialed, and the calling terminal knows a called phone number. Therefore, the calling terminal may obtain a calling phone number and the called phone number locally, and generate the auxiliary link establishment request.

For example, the first terminal is a called terminal. When establishing the auxiliary link, the called terminal has received the INVITE sent by the calling terminal on the primary link. Because the INVITE includes the calling phone number and the called phone number, the called terminal may obtain the calling phone number and the called phone number locally, and generate the auxiliary link establishment request.

S1102: The server sends the auxiliary link establishment request to the second terminal based on the second feature identifier.

Both the first terminal and the second terminal register with a same server, and can separately perform data transmission with the server. The server maintains a registration information table, including unique feature identifiers of all registered users. After receiving the auxiliary link establishment request, the server authenticates, based on the first feature identifier in the request and the registration information table, whether the first terminal has access permission. If the user has the access right, the server determines whether the second feature identifier carried in the request is in the registration information table. If the second feature identifier can be found in the registration information table, the server sends the auxiliary link establishment request to the second terminal based on the second feature identifier.

S1103: After receiving the auxiliary link establishment request, the second terminal sends a response message to the first terminal by using the server.

According to the foregoing steps S1101 to S1103, the auxiliary link may be established between the first terminal and the second terminal by using the server, and the call data packet is transmitted between the first terminal and the second terminal by using the server.

By using the method for establishing the server auxiliary link shown in the foregoing steps S1101 to S1103, reliability of the server auxiliary link can be ensured, and a case in which the server auxiliary link fails to be established because a terminal cannot be connected to the server is avoided to some extent.

In addition, in an example, the first terminal and the second terminal each may actively establish a connection to the server at a preset time point, to form the server auxiliary link. For example, the preset time point may be a time point at which establishment of the primary link starts, a time point at which establishment of the primary link succeeds, or the like. When the first terminal and the second terminal need to transmit the call data packet by using the server auxiliary link, the call data packet is sent to the server. After receiving the call data packet, the server may forward the call data packet to a corresponding terminal.

It may be understood that, by establishing the server in advance, the terminal may enable the auxiliary link at any time during a call, and transmit the call data packet by using the auxiliary link, thereby quickly improving call quality.

In an auxiliary link establishment process, regardless of the point-to-point auxiliary link or the server auxiliary link, the terminal may establish the auxiliary link by using Wi-Fi or cellular data of a subscriber identity module (Subscriber Identity Module, SIM) card. For a terminal on which at least two SIM cards are installed, the auxiliary link may be established by using cellular data of a SIM card that currently provides a call service, or the auxiliary link may be established by using cellular data of another SIM card. This is not limited in this embodiment.

The first terminal and the second terminal may establish a same auxiliary link in a same network access manner, or may establish a same auxiliary link in different network access manners. For example, the first terminal and the second terminal may jointly use Wi-Fi to establish the auxiliary link. Alternatively, the first terminal uses Wi-Fi, and the second terminal uses cellular data to establish the auxiliary link.

The first terminal or the second terminal may also preferably establish the auxiliary link by using Wi-Fi. For example, when a user is at home or works in a company, indoor network signals are weak due to building blocking. In this case, Wi-Fi can be preferably used to establish the auxiliary link. When Wi-Fi signals are weak or Wi-Fi cannot be connected, cellular data can be used to establish the auxiliary link.

After the auxiliary link is established, the first terminal and the second terminal may always use the auxiliary link to transmit the call data packets until the call ends since the auxiliary link is successfully established. Alternatively, the auxiliary link may be used to transmit the call data packets only in a process in which the call quality of the primary link is abnormal. This is not limited in this embodiment.

In addition, optionally, referring to Table 1, when the first terminal and the second terminal establish the auxiliary link by using Wi-Fi at the same time, the auxiliary link may be put into use immediately after being established, to transmit the call data packets until the call ends. When at least one terminal in the call establishes the auxiliary link by using cellular data, and when it is detected that call quality is abnormal, the auxiliary link may be used to transmit the call data packets, and after the call quality is normal, use of the auxiliary link is suspended, so as to avoid consuming a large amount of cellular data traffic of the user.

TABLE 1

Table of a data packet sending mode on an auxiliary link

| Auxiliary link establishment mode | | |
| --- | --- | --- |
| First terminal | Second terminal | Call data packet transmission mode |
| Wi-Fi | Wi-Fi | Transmission since the auxiliary link is established |
| Wi-Fi | Cellular network | Transmission during call quality exception |
| Cellular network | Wi-Fi | Transmission during call quality exception |
| Cellular network | Cellular network | Transmission during call quality exception |

When the terminal establishes the auxiliary link by using cellular data, for a terminal on which two SIM cards are installed, one of the two SIM cards may be selected based on a current SIM card (that is, a call card) that provides a call service, and the auxiliary link is established by using cellular data of the selected SIM card.

For example, if a secondary card is a current call card, cellular data of a primary card is preferably used to establish the auxiliary link.

If the primary card is a call card, when a moving rate of the terminal is less than a rate threshold (for example, 10 Km/h), cellular data of the secondary card is preferably used when signal quality of the primary card is poor, and cellular data of the primary card is preferably used when signal quality of the primary card is relatively good. When the movement rate of the terminal is greater than the rate threshold, to avoid frequent handovers between cells of the auxiliary link and the primary link at the same time, the cellular data of the secondary card may be preferably used to establish the auxiliary link.

For a scenario in which the terminal has only one SIM card, when the terminal uses cellular data to establish the auxiliary link, the terminal may first determine signal quality of the SIM card. If the signal quality is less than a threshold, the terminal does not establish the auxiliary link by using the cellular data. In addition, after the auxiliary link is established, if it is detected that a delay of a call data packet on the auxiliary link is greater than a delay threshold, the auxiliary link is stopped to be used.

Optionally, after the auxiliary link is successfully established, the first terminal and/or the second terminal may separately detect MOS values of calls on the primary link and the auxiliary link, and select a link with a relatively high MOS value to perform a call. It should be understood that the link with the relatively high MOS value may be the primary link, or may be the auxiliary link. In addition, the call link may be switched again during the call.

The following describes a process of transmitting call data packets on the primary link and the auxiliary link.

In this embodiment, in a process in which the first terminal and the second terminal are in a call, a data transmission mode of the primary link or the auxiliary link may be a unidirectional transmission mode, or may be a bidirectional transmission mode. Certainly, the call data packets may be transmitted on the primary link and the auxiliary link by using the unidirectional transmission mode and the bidirectional transmission mode together. For example, the primary link transmits the call data packets in the bidirectional transmission mode, and the auxiliary link transmits the call data packets in the unidirectional transmission mode.

For example, a user A makes a call by using the first terminal, and a user B makes a call by using the second terminal. During the call between the user A and the user B, the user A can clearly hear the user B's voice, but the user B cannot or cannot clearly hear the user A's voice. This indicates that transmission of a call data packet from the second terminal to the first terminal is normal, but transmission of a call data packet from the first terminal to the second terminal is abnormal. In other words, unidirectional transmission of the call data packet is abnormal. Therefore, the call data packet from the first terminal to the second terminal may be transmitted only by using the auxiliary link.

Figure 12:
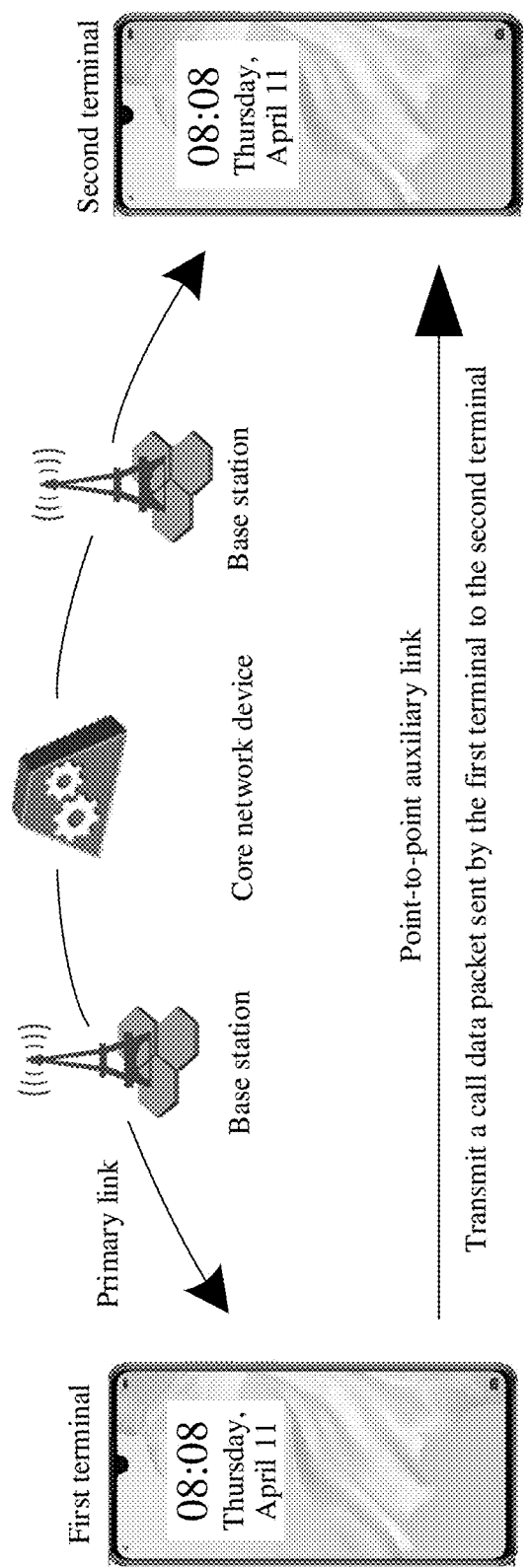
FIG. 12 is a schematic diagram 3 of a call link according to an embodiment of this application.
Figure 13:
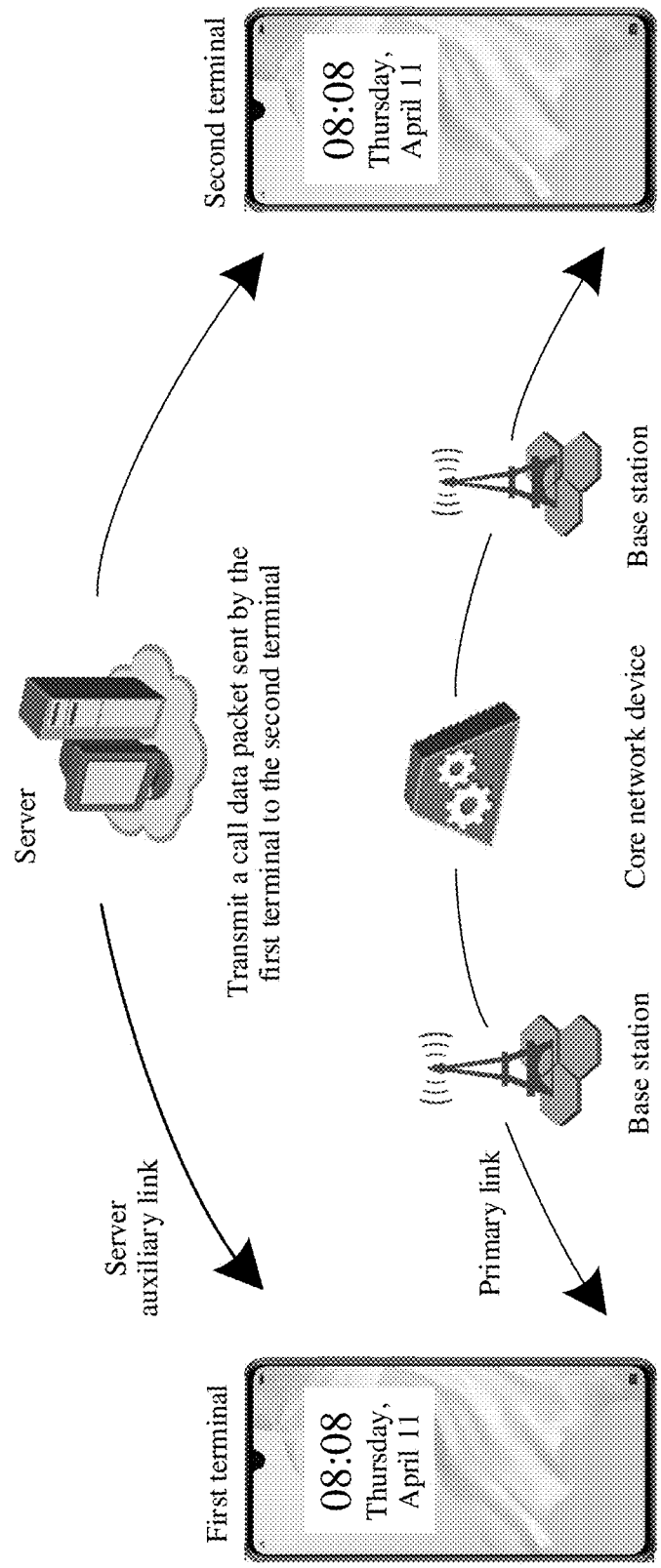
FIG. 13 is a schematic diagram 4 of a call link according to an embodiment of this application.

For example, as shown in FIG. 12 or FIG. 13, when the first terminal detects that uplink call quality is abnormal but downlink call quality is normal, the call data packets may be transmitted bidirectionally between the first terminal and the second terminal by using the primary link, and the call data packets collected by the first terminal are sent to the second terminal only by using the auxiliary link. In FIG. 12, the primary link is a base station-based core network link, and the auxiliary link is a point-to-point auxiliary link. As shown in FIG. 13, the primary link is the base station-based core network link, and the auxiliary link is the server auxiliary link.

During a call, the terminal continuously collects call data packets of the user. Each call data packet has a sequence number, and the sequence number increases sequentially based on a time sequence of generation.

For example, in a talk spurt of the user (that is, in a process in which the user speaks), the terminal collects and generates a voice data packet by using a microphone every 20 milliseconds (ms). A silence frame is generated every 160 ms during a silence period of the user (that is, during a pause in the user's speech). For a video call, when collecting a voice data packet, the terminal further collects and generates a video data packet by using a camera at an interval of 43 ms.

Figure 14A:
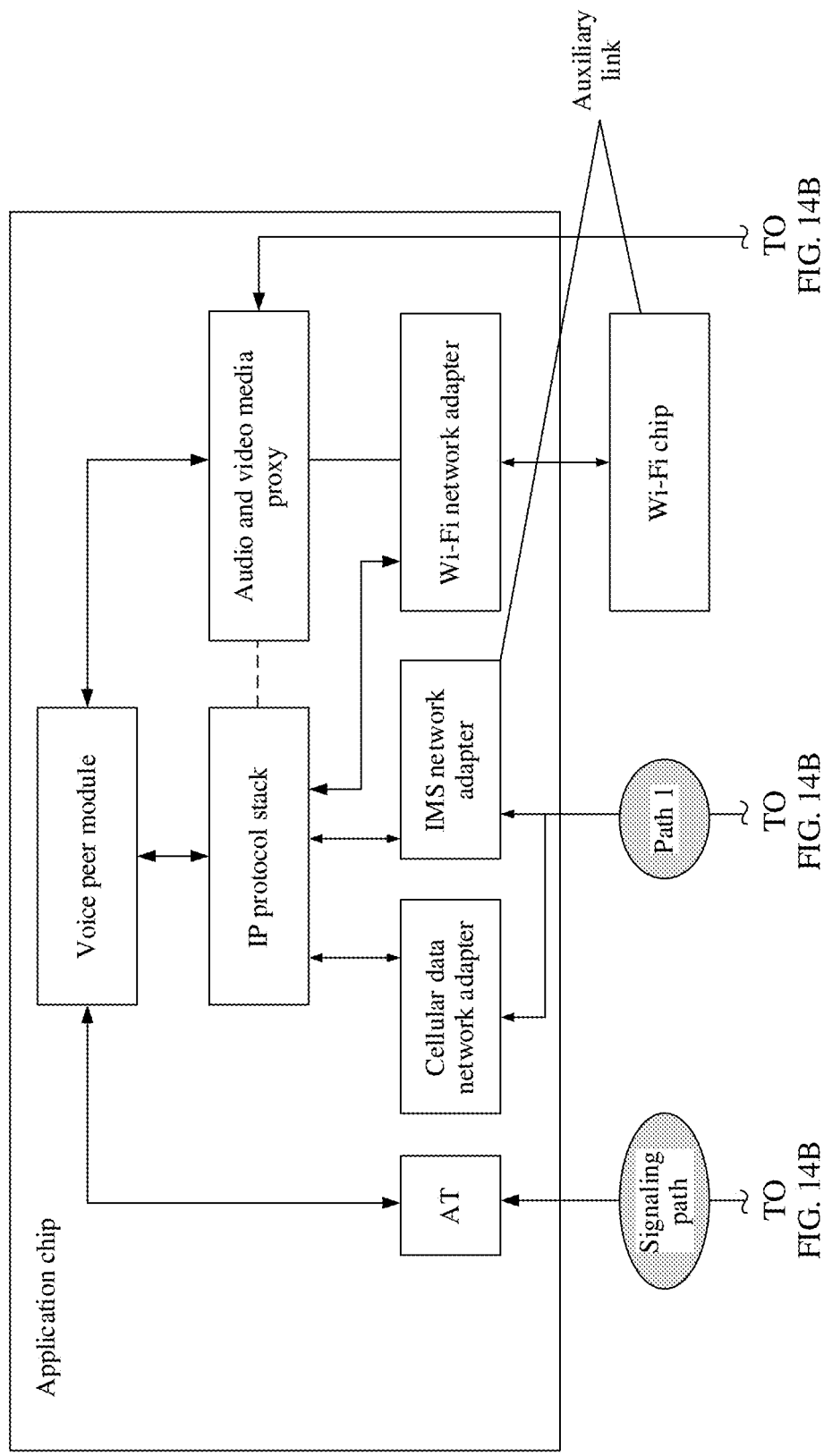
FIG. 14A and FIG. 14B are a schematic diagram of a principle of sending a call data packet according to an embodiment of this application.
Figure 14B:
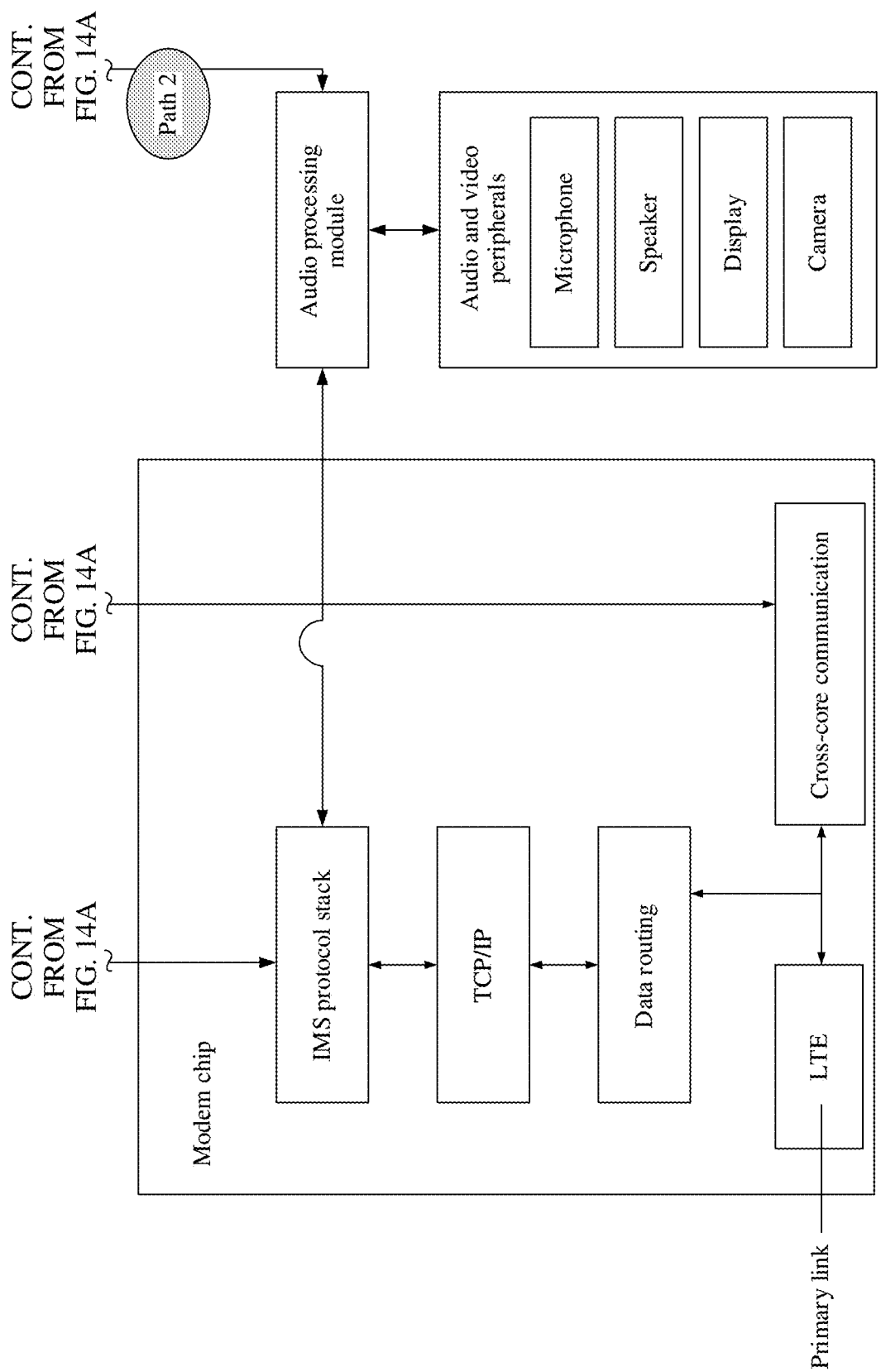

FIG. 14A and FIG. 14B are a schematic diagram of a transmission principle of a call data packet of a terminal, and shows a principle of sending, by a terminal, call data packets by using a primary link and an auxiliary link. The following separately describes a process in which the terminal sends the call data packets to the primary link and the auxiliary link.

(1) The terminal sends a call data packet to the primary link.

The terminal collects call data of a user by using audio and video peripherals, and encapsulates the call data by using an audio and video processing module, to form the call data packet. Subsequently, the audio and video processing module sends the call data packet to an IMS protocol stack of a modem (Modem), and selects a TCP/IP protocol from the IMS protocol stack to further encapsulate the call data packet. Finally, the call data packet is sent to a cellular network through an LTE air interface, and enters the primary link.

(2) The terminal sends a call data packet to the auxiliary link.

The call data packet on the auxiliary link may be obtained by allocating or copying the call data packet on the primary link. The terminal may send the call data packet to the auxiliary link through the following path 1 or path 2.

Path 1: The audio and video processing module sends the call data packet to the modem, and selects the TCP/IP protocol from the IMS protocol stack to further encapsulate the call data. Subsequently, through data routing, the call data packet is sent to an IMS network adapter on an application chip (Application Processor, AP) side in a cross-core communication manner. After receiving the call data packet, the IMS network adapter sends the call data packet to a voice peer module by using the IP protocol stack. The voice peer module sends the call data packet to the auxiliary link by using the IP protocol stack and a data service network interface card or a Wi-Fi network interface card.

When the path 1 is used, the audio and video processing module, the IMS protocol stack, or data routing module may copy or allocate the call data packet on the primary link, to obtain the call data packet of the auxiliary link.

Path 2: The audio and video processing module sends the call data packet of the auxiliary link to the voice peer module by using an audio and video media proxy on the AP side, and the voice peer module sends the call data packet to the auxiliary link by using the IP protocol stack and the data service network adapter or the Wi-Fi network adapter.

When the path 2 is used, the audio and video processing module may copy or allocate the call data packet on the primary link, so as to obtain the call data packet of the auxiliary link.

In addition, referring to FIG. 14A and FIG. 14B, a signaling path is further disposed in the terminal, and is configured to transmit control signaling between the application chip and a modem chip by using an attention (Attention, AT) command. For example, the application chip sends an IP address and a port number of the terminal to the modem chip by using the AT command, and the modem chip sends the IP address and the port number to the peer end by using the primary link. Alternatively, after receiving an IP address and a port number that are sent by the peer end, the modem chip sends the IP address and the port number to the application chip by using an AT command. In addition, the path 1 and the path 2 may also be used to transmit control signaling between the application chip and the modem chip.

In this embodiment, the terminal may send the call data packet to the peer end in a replacement or supplement manner. The following describes manners of configuring data packets on the primary link and the auxiliary link in the two manners. In a replacement manner, the manner of configuring the call data packets on the primary link and the auxiliary link is a manner 1, that is, the call data packets on both the primary link and the auxiliary link need to be kept complete. In the packet supplementation manner, a manner of configuring the call data packets on the primary link and the auxiliary link may be the manner 1, a manner 2, a manner 3, or a manner 4, and the primary link and the auxiliary link at least supplement each other.

Figure 15:
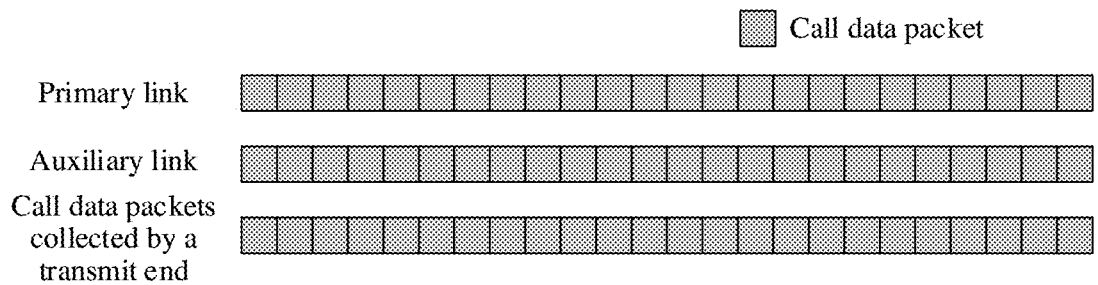
FIG. 15 is a schematic diagram 1 of allocation of dual-link call data packets according to an embodiment of this application.

Manner 1: Referring to FIG. 15, after generating the call data packets, the terminal simultaneously transmits all the call data packets by using the primary link and the auxiliary link, so as to reduce a quantity of call data packets missing at a receive end. It may be understood that, in the manner 1, the primary link is used to transmit a plurality of first call data packets, the auxiliary link is used to transmit a plurality of second call data packets, and the plurality of first call data packets and the plurality of second call data packets are completely the same, or the plurality of first call data packets and the plurality of second call data packets have different encoding rules.

Figure 16:
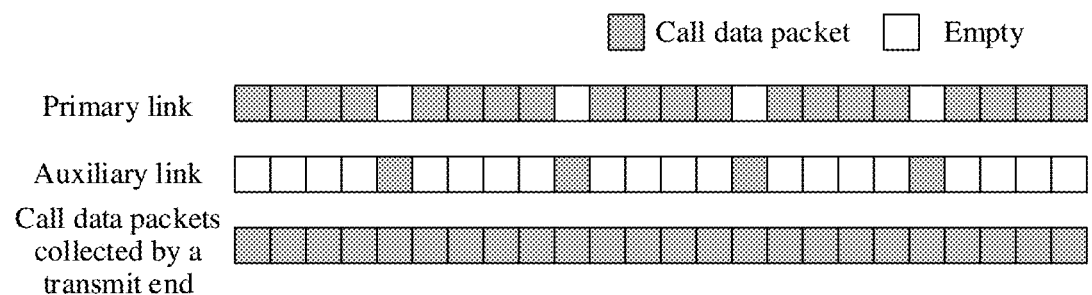
FIG. 16 is a schematic diagram 2 of allocation of dual-link call data packets according to an embodiment of this application.

Manner 2: Referring to FIG. 16, when the primary link is congested, the terminal may reduce a quantity of sent call data packets on the primary link, and perform, by using the auxiliary link, compensation sending on the call data packets discarded on the primary link, so as to reduce a quantity of transmitted data packets on the primary link. For example, one call data packet is discarded every time two call data packets are sent on the primary link, or one call data packet is discarded every time three call data packets are sent, or one call data packet is discarded every time four call data packets are sent, so as to reduce call data packet transmission pressure on the primary link. It may be understood that, in the manner 2, the primary link is used to transmit a plurality of first call data packets, the auxiliary link is used to transmit a plurality of second call data packets, and the plurality of first call data packets and the plurality of second call data packets are totally different.

Figure 17:
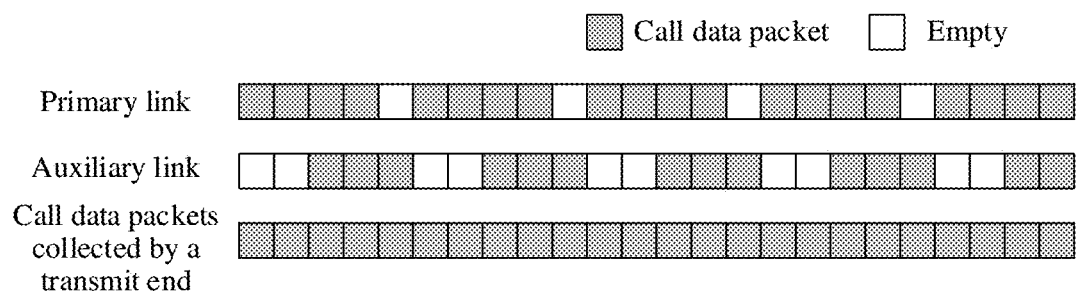
FIG. 17 is a schematic diagram 3 of allocation of dual-link call data packets according to an embodiment of this application.

Manner 3: Referring to FIG. 17, when congestion occurs on the primary link, the terminal may copy some of the call data packets on the primary link and transmit some of the call data packets by using the auxiliary link, and reduce a transmission amount of the call data packets on the primary link, so that transmission pressure of the call data packets on the primary link is reduced. It may be understood that, in the manner 3, the primary link is used to transmit a plurality of first call data packets, the auxiliary link is used to transmit a plurality of second call data packets, and only some of the plurality of first call data packets and the plurality of second call data packets are the same.

In manners 1 to 3, a sum of all first call data packets transmitted on the primary link and all second call data transmitted on the auxiliary link includes all call data collected by a transmit end.

Figure 18:
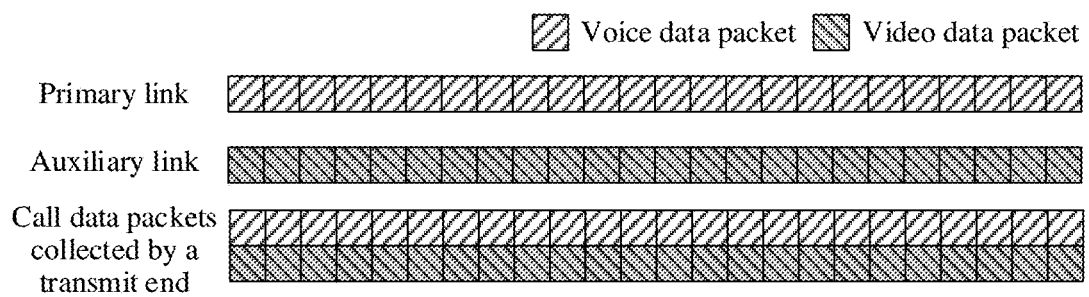
FIG. 18 is a schematic diagram 4 of allocation of dual-link call data packets according to an embodiment of this application.
Figure 19:
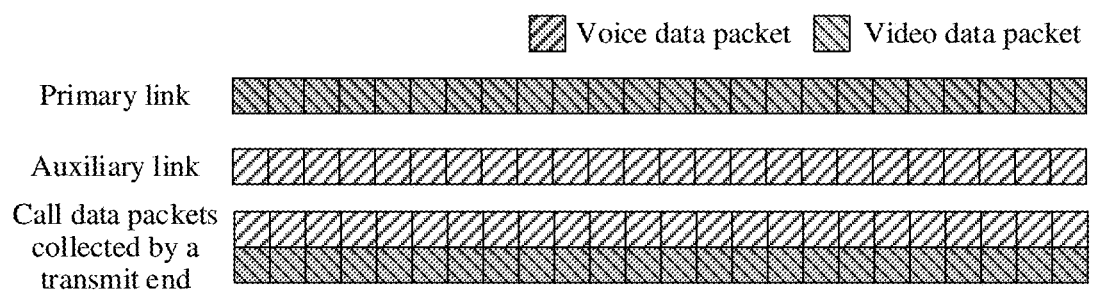
FIG. 19 is a schematic diagram 5 of allocation of dual-link call data packets according to an embodiment of this application.

Manner 4: Referring to FIG. 18 and FIG. 19, in a video call process, the terminal may transmit a voice data packet by using a primary link and transmit a video data packet by using an auxiliary link; or transmit a video data packet by using a primary link and transmit a voice data packet by using an auxiliary link.

It should be noted that the auxiliary link may be used only to transmit a call data packet, but not to transmit a silence frame. In a process of copying the call data packet, the terminal copies the call data packet together with a sequence number of the call data packet.

For example, the first terminal sends the call data packet to the second terminal. For the primary link, after collecting a PCM data stream, the first terminal device usually further encodes the PCM data stream, for example, performs Opus, AMR-WB, Opus, AMR-NB, AMR-WB, or EVS encoding, encapsulates the PCM data stream into a first RTP data packet by using an IMS protocol stack, and sends the first RTP data packet to the second terminal. The call data packet transmitted on the auxiliary link may be a first RTP data packet copied or allocated on the primary link, or may be a second RTP data packet, where the second RTP data packet is obtained by directly encapsulating the PCM data stream. In this embodiment, the IMS protocol stack includes an RTP/RTCP protocol stack.

For the replacement manner, the call data in the RTP call data packet of the auxiliary link may be a PCM data stream; or may be call data with a better encoding rule, where the encoding rule of the call data is usually different from that of the primary link; or may be a PCM data stream on which lossless encoding is performed. A lossless encoding manner may be Huffman (Huffman) encoding or the like.

Figure 20:
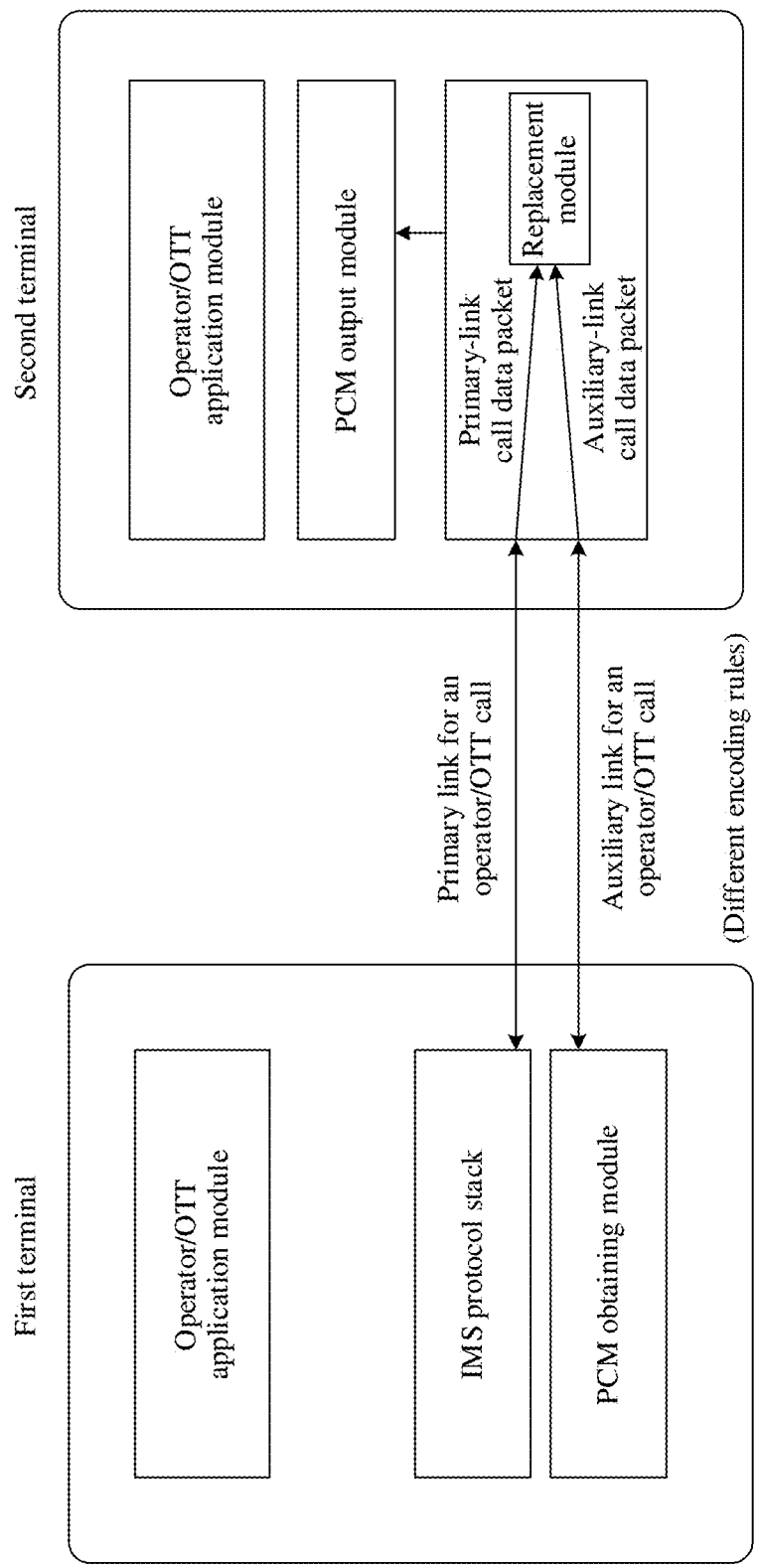
FIG. 20 is a schematic diagram 1 of call data packet transmission according to an embodiment of this application.

An example in which the RTP call data packet is a PCM data stream is used. Refer to FIG. 20. The first terminal separately sends the call data packets with different encoding rules to the second terminal by using the primary link and the auxiliary link by using the IM protocol stack. After receiving the call data packets of the primary link and the auxiliary link, optionally, when the call quality of the primary link is abnormal, the second terminal uses the call data packet of the auxiliary link and discards the call data packet of the primary link; and when the call quality of the primary link is normal, the second terminal continues to use the call data packet of the primary link. Alternatively, the second terminal directly discards the call data packet of the primary link, and uses only the call data packet of the auxiliary link.

Figure 21:
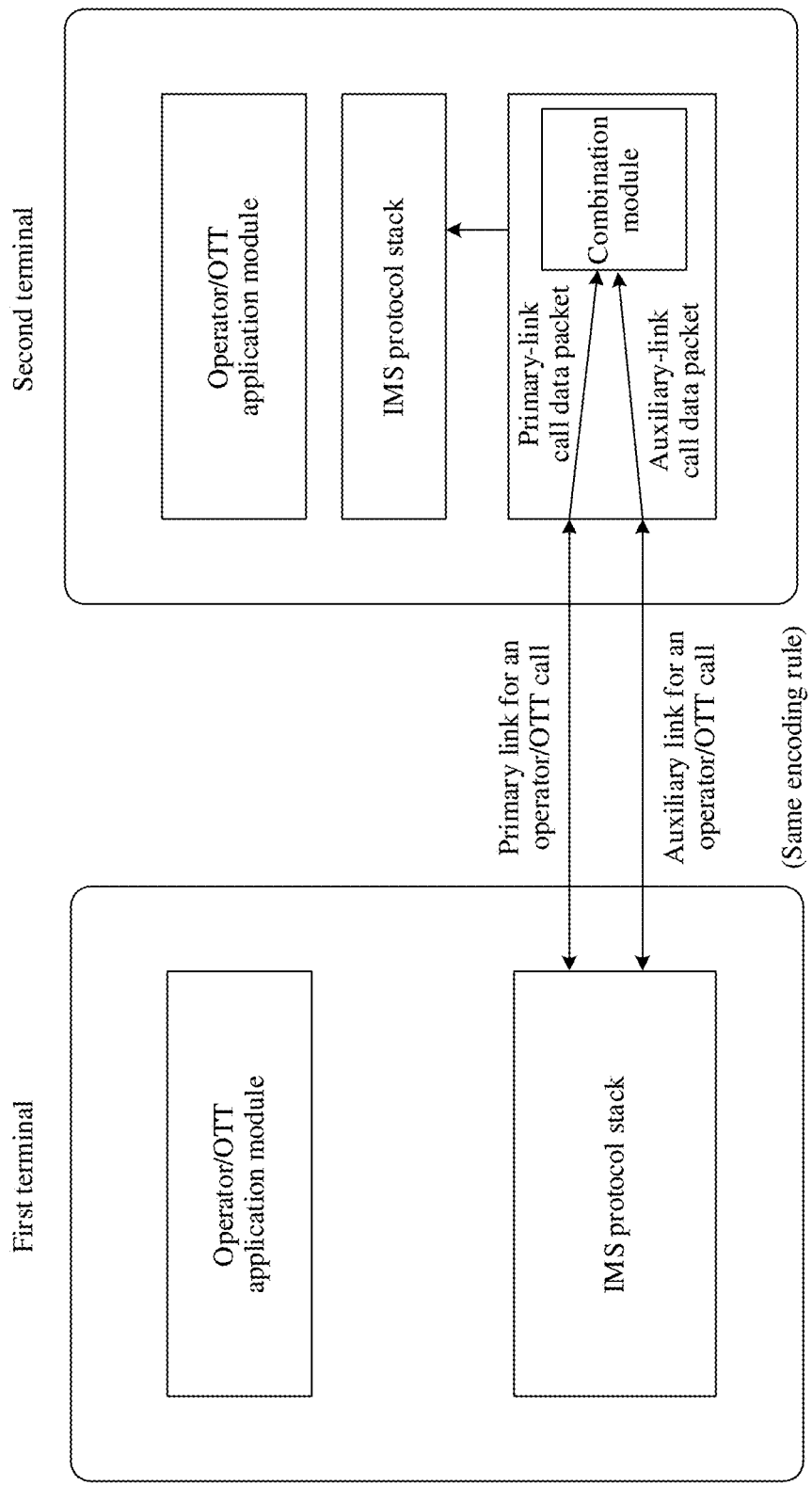
FIG. 21 is a schematic diagram 2 of call data packet transmission according to an embodiment of this application.

In packet supplement mode, the call data packet of the auxiliary link is allocated or copied from the primary link. The encoding rule of the auxiliary link is the same as that of the primary link. The encoding rule includes a sampling rate, an encoding mode, an encoding rate, encoding quality, resolution, a frame rate, and the like. Refer to FIG. 21. After collecting the call data packets, the first terminal may allocate the call data packets of the primary link and the auxiliary link in any one of the manner 1 to the manner 4. Subsequently, the first terminal separately sends the call data packets to the second terminal by using the primary link and the auxiliary link by using the IMS protocol stack. After receiving the call data packets of the primary link and the auxiliary link, the second terminal combines the two call data packets. In this embodiment, in the call process, an operator call fee of the primary link is not affected, and the operator call fee is not charged for the auxiliary link.

Optionally, when the auxiliary link is a Wi-Fi link, the terminal device preferably transmits an original PCM data stream of the call data. When bandwidth is limited, the terminal device encodes the original PCM data stream by using an Opus format, and then transmits the encoded original PCM data stream (a code rate maybe 32 kbps).

Optionally, when the auxiliary link is a cellular data link, the terminal device preferably uses the Opus format to encode the original PCM data stream before transmission. In addition, some users (for example, users who consume relatively large traffic each month) may still preferably transmit the original PCM data stream of the call data. When bandwidth is limited, the original PCM data stream is encoded by using the Opus format before transmission (a code rate maybe 32 kbps).

When the call data packet is sent by using the primary link or the auxiliary link, the first terminal and/or the second terminal may further determine an encoding rule of the call data packet in the link based on uplink call quality parameters of the link, for example, parameters such as a sampling rate, an encoding rate, encoding quality, resolution, a frame rate, and a quantity of sound channels.

Specifically, for example, the transmit end is the first terminal, and the first terminal may detect an uplink call quality parameter of the first terminal. When the uplink call quality parameter falls within a preset range, the first terminal keeps parameters such as a sampling rate, an encoding rate, encoding quality, resolution, a frame rate, or a quantity of sound channels of the sent call data packet unchanged. When the uplink call quality parameter is better than the preset range and continues to be optimized, the first terminal increases parameters such as a sampling rate, an encoding rate, encoding quality, resolution, a frame rate, and a quantity of sound channels. When the uplink call quality parameter is worse than the preset range and continues to become worse, the first terminal reduces parameters such as a sampling rate, an encoding rate, encoding quality, resolution, a frame rate, and a quantity of sound channels of the sent call data packet.

By using the call data packet sending manner provided in this embodiment, at least one of the encoding rate, the encoding quality, and the sampling rate of the call data packet may be adjusted based on link quality, so that call quality of the first terminal and the second terminal is maintained in an optimal state as much as possible.

For example, for voice data packets in a voice call and a video call, the first terminal may detect an uplink call quality parameter of the voice. If the uplink call quality parameter of the voice changes within the preset range, the encoding rate, the encoding quality, and the sampling rate of the current voice remain unchanged. Different coding schemes of the voice have different coding quality. The coding schemes of the voice may include PCM, Opus, AMR-NB, AMR-WB, EVS coding, and the like. In addition, the coding quality increases in an order of PCM, Opus, AMR-NB, AMR-WB, and EVS coding. The sampling rate of the voice may be 8 kHz (kilohertz), 16 kHz, 32 kHz, or the like. A higher sampling rate indicates a clearer voice.

In this embodiment, a preset range of the uplink call quality parameter of the voice is pre-configured. For example, the pre-configuration of the preset range may include that an uplink air interface transmission rate ranges from 10 to 20 kilobits per second (kbps), a packet loss rate ranges from 0 to 1%, a delay ranges from 0 to 100 ms, and the like.

When detecting that a current uplink call quality parameter of the voice on the primary link or the auxiliary link is better than the preset range and continues to be optimized, the first terminal improves an encoding rate and encoding quality of the voice data packet. For example, an encoding rate of voice data in the voice data packet is increased from 12.65 kbps to 23.85 kbps, and an encoding manner of the voice data in the voice data packet is sequentially changed based on an order of PCM, Opus, AMR-NB, AMR-WB, and EVS encoding, so as to improve current call quality. Alternatively, the sampling rate of the voice data is gradually increased, for example, from 8 kHz to 16 kHz.

When detecting that the current uplink call quality parameter of the voice on the primary link or the auxiliary link is worse than the preset range and continues to become worse, the first terminal reduces an encoding rate and encoding quality of the voice data packet. For example, the coding rate of the voice data packet is reduced from 23.85 kbps to 6.6 kbps, and coding manners of the voice data packet are sequentially changed based on an order of EVS, AMR-WB, and AMR-NB coding, so as to improve current call quality.

Alternatively, the sampling rate of the voice data is gradually reduced, for example, from 16 kHz to 8 kHz.

In a possible implementation, for the voice data packet, when the primary link uses a low coding rate, a low-quality coding scheme, or a low sampling rate (for example, an encoding rate is 4.75 kbps, an encoding scheme is AMR-NB, and a sampling rate is 8 kHz), the auxiliary link may use a high coding rate and a high-quality coding scheme (for example, an encoding rate is 24.4 kbps, an encoding scheme is EVS, and a sampling rate is 16 kHz).

For a video data packet in a video call, if an uplink call quality parameter of the video changes within the preset range, an encoding rate, encoding quality, resolution, a frame rate, and the like of the current video are maintained. Different coding schemes of the video have different coding quality. The coding schemes of the video may include H264, H265, H266, and the like. In addition, the coding quality of the video increases sequentially in an order of H264, H265, and H266. Resolution of the video maybe a video graphics array (Video Graphics Array, VGA), 720P, 1080P, or the like, and the resolution of the video is increasingly high in an order of VGA, 720P, and 1080P. A frame rate of the video maybe 15 fps (frame per second), 22 fps, 30 fps, or the like, and a larger frame rate indicates a smoother video.

In this embodiment, the preset range of the uplink call quality parameter of the video is pre-configured. For example, the uplink call quality parameter may include an uplink air interface transmission rate ranging from 10 kbps to 20 kbps, a packet loss rate ranging from 0 to 0.1%, a delay ranging from 0 ms to 150 ms, and the like.

When it is detected that on the primary link and/or the auxiliary link, the current uplink call quality parameter of the video is better than the preset range, and continues to be optimized, at least one of a current encoding rate, encoding quality, resolution, and a frame rate of the video in the video data packet is improved. For example, the encoding rate of the video in the video data packet is increased from 800 kbps to 1200 kbps, and an encoding manner is sequentially changed based on an order of H264 encoding and H265 encoding, so as to improve a current call. Alternatively, the resolution of the video is increased, for example, from 720P to 1080P, so as to improve image quality of the video. Alternatively, a frame rate of the video is increased, for example, from 22 fps to 30 fps, to improve smoothness of video watching.

When it is detected that on the primary link or the auxiliary link, the current uplink call quality parameter of the video is worse than the preset range and continues to become worse, at least one of a current encoding rate, encoding quality, resolution, or frame rate of the video data packet is reduced. For example, the encoding rate of the video data packet is reduced from 800 kbps to 600 kbps, and an encoding manner is sequentially changed based on an order of H265 encoding and H264 encoding, so as to improve current call quality. Alternatively, the resolution of the video is reduced, for example, from 1080P to 720P. Alternatively, the frame rate of the video is reduced, for example, from 30 fps to 22 fps.

In a possible implementation, for a video data packet, when the primary link uses a low encoding rate, a low-quality encoding scheme, a low resolution, or a frame rate (for example, the encoding rate is 600 kbps, the encoding scheme is H264, the resolution is 720P, and the frame rate is 15 fps), the auxiliary link may use a high encoding rate and a high-quality encoding scheme (for example, the encoding rate is 1000 kbps, the encoding scheme is H265, the resolution is 1080P, and the frame rate is 22 fps).

To ensure security and reliability of data packet transmission on the primary link and the auxiliary link, the first terminal and the second terminal may encrypt the call data packet according to a preset encryption rule and then send the encrypted call data packet to a peer end. The receive end decrypts the call data packet according to a corresponding decryption rule.

After receiving call data packets from at least two links, the first terminal and/or the second terminal need/needs to perform post-processing on the call data packets. The post-processing includes combining, deduplicate, and sorting the call data packets. The combination refers to processing the call data packets received on the at least two links into one link. Deduplication is to delete redundant call data packets with a same sequence number and retain only one of them. Sorting refers to arranging the call data packets in ascending order of sequence numbers.

Usually, sequence numbers of the call data packets do not change in a sending process, and the sequence numbers of the call data packets received by the terminal by using the two links are of a same type. In this case, call data packets of all links are aggregated to complete combination, and then deduplication and sorting are performed in a unified manner.

However, in some embodiments, in a transmission process of some links, the sequence numbers of the call data packets maybe converted into sequence numbers of another type. In this case, sequence number types of the call data packets received by the terminal by using the at least two links may be different, and the terminal cannot directly combine the call data packets based on the sequence numbers. For example, after a call data packet is transmitted across operators on the primary link, a sequence number of the call data packet may be converted into a sequence number of another operator.

Therefore, in a possible implementation, when receiving the call data packets with different types of sequence numbers, the terminal combines the call data packets based on a link quality parameter of a receive link.

For example, the first terminal and/or the second terminal may determine link quality parameters of the primary link and each auxiliary link; determine an optimal call link based on the link quality parameters; and use call data packets received from the optimal call link as a combined call data packet. In other words, the call data packets received on the optimal call link are reserved, and call data packets received on remaining links are discarded, so that call data packets on a plurality of links are processed as the call data packets on one link. The link quality parameter may include a packet loss rate, a jitter, a delay, and the like of the call data packet. It should be understood that, in this embodiment, based on different link quality parameters, the optimal call link may be the primary link or the auxiliary link.

For another example, the first terminal and/or the second terminal may determine the link quality parameter of the primary link and the link quality parameter of each auxiliary link; and determine at least two auxiliary links based on the link quality parameters. If comprehensive call quality of the at least two auxiliary links is higher than call quality of the primary link, call data packets on the at least two auxiliary links are combined, and call data packets of the primary link and other auxiliary links are discarded, so that call data packets on a plurality of links are processed as the call data packets on one link.

In another possible implementation, when receiving call data packets having different types of sequence numbers, the terminal may perform audio and video feature fusion on the call data packets to obtain a fused call data packet, and use the fused call data packet as the combined call data packet. For example, the audio and video feature may be a voice waveform, a video picture feature, or the like.

In conclusion, by using the auxiliary-link-based call compensation method provided in this embodiment, the call data packets may be transmitted by using the auxiliary link and the primary link. The method can not only improve problems such as call discontinuity, no sound, and video freezing caused by a network signal exception, but also improve current call quality of the terminal to some extent even if an access network element or a core network device is abnormal during a call.

In addition, usually, when the terminal makes a call by using the primary link alone, if no downlink call data packet is received within a preset time period (for example, 20 seconds), the terminal automatically drops the current call.

Therefore, in the auxiliary link compensation call method provided in this embodiment, even if the primary link is interrupted because the terminal cannot receive the downlink call data packet of the primary link within the preset time segment, the auxiliary link can still be used to transmit the call data packet between the two call terminals, thereby ensuring normal progress of the current call.

Currently, many terminals are provided with two microphones that are far away from each other. During a call, the two microphones collect call data at different locations at the same time. In this embodiment, call data of a first microphone maybe used as left channel call data, and call data collected by a second microphone may be used as right channel call data.

Figure 22:
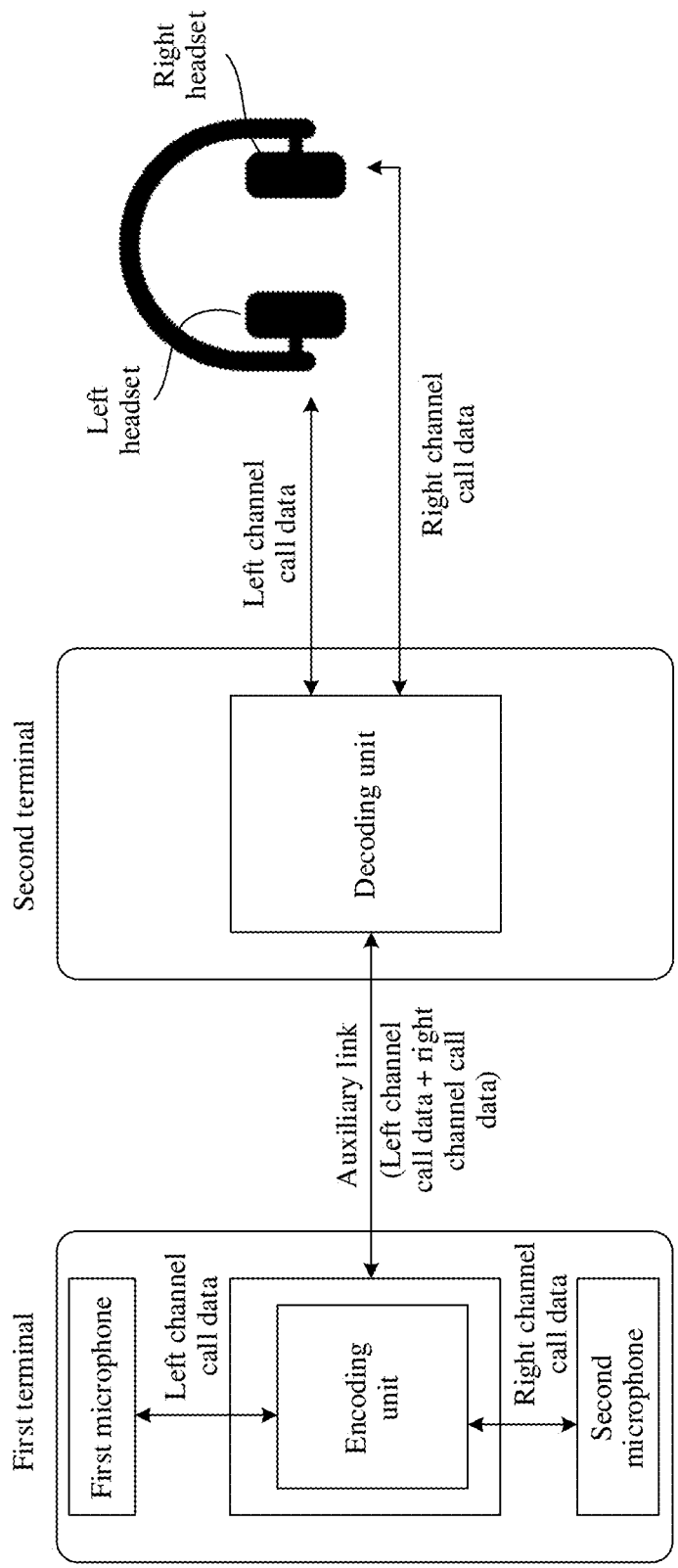
FIG. 22 is a schematic diagram 1 of dual-channel call data packet transmission according to an embodiment of this application.

Refer to FIG. 22. In an auxiliary link compensation call process, the first terminal may jointly encode the left channel call data and the right channel call data by using an encoding unit, process the left channel call data and the right channel call data into one call data packet, and send the call data packet to the second terminal by using the auxiliary link. After receiving the call data packet of the auxiliary link, the second terminal may decode the call data packet by using a decoding unit, separate the left channel call data and the right channel call data from the call data packet, and separately play the left channel call data and the right channel call data by using a first playing component (for example, a left headset and a left sound box) and a second playing component (for example, a right headset and a right sound box), thereby implementing a stereo effect of a call at the receive end.

Figure 23:
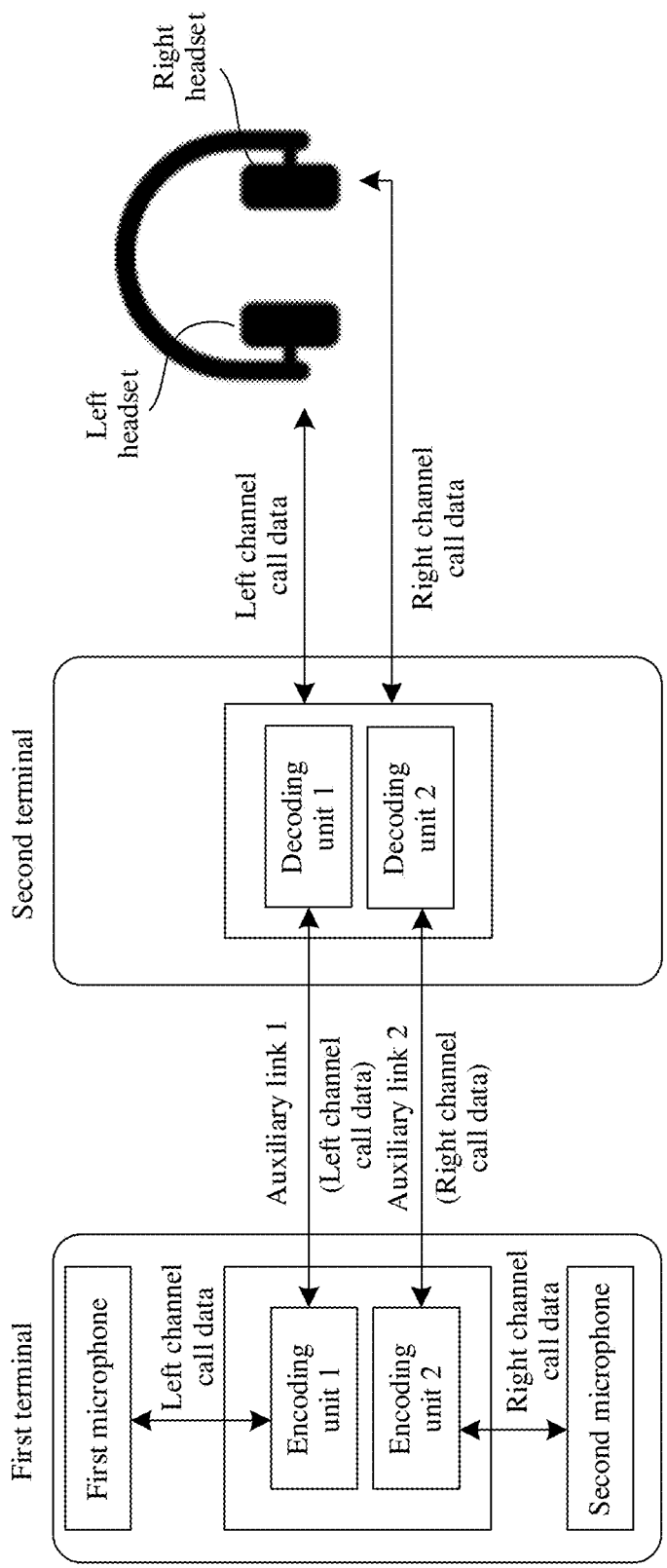
FIG. 23 is a schematic diagram 2 of dual-channel call data packet transmission according to an embodiment of this application.

Alternatively, referring to FIG. 23, in an auxiliary link compensation call process, the first terminal may encode the left channel call data by using an encoding unit 1, and send the encoded left channel call data to the second terminal by using an auxiliary link 1; and encode the right channel call data by using an encoding unit 2, and send the encoded right channel call data to the second terminal by using an auxiliary link 2. After receiving the call data packets of the two auxiliary links, the second terminal may use the decoding unit 1 to decode a call data packet on the auxiliary link 1, and play, by using the first playing component (for example, a left headset or a left sound box), the left channel call data through decoding. In addition, the second terminal further decodes, by using the decoding unit 2, the call data packet received by using the auxiliary link 2, and plays, by using the second playing component (for example, a right headset or a right sound box), the right channel call data obtained through decoding, so as to implement a stereo effect of a call at the receive end.

It should be noted that, in this embodiment, the first playing component and the second playing component may further belong to different devices. For example, the first playing component is a speaker of the receive-end device (for example, the second terminal), and the second playing component is a mono headset connected to the receive-end device.

In addition, the technical solutions used in the embodiments of this application may be further extended to a scenario in which the terminal uses an internet-based application service communication (over the top, OTT) technology to make a call. When the terminal makes an OTT call, the access network device may be a base station or a Wi-Fi device. OTT means that internet companies develop various video and data services based on the open internet across an operator.

In a process in which the first terminal and the second terminal perform the OTT call, the primary link may be a point-to-point auxiliary link established according to an IP protocol or a D2D protocol, or may be a server auxiliary link established according to an IP protocol or a D2D protocol. When the first terminal meets an auxiliary link establishment condition, the first terminal establishes at least one auxiliary link with the second terminal, where the auxiliary link is different from the primary link. For example, when the primary link is the point-to-point auxiliary link established according to the IP protocol, the server auxiliary link established according to the IP protocol is further established, so as to transmit a call data packet by using a plurality of links, thereby improving quality of an OTT call and further improving user experience.

It should be noted that, in this embodiment, for the auxiliary link establishment condition, an establishment process, and a mode of using the primary link and the auxiliary link by the first terminal and the second terminal after the auxiliary link is established, refer to the foregoing description. Details are not described herein again in this embodiment.

In addition, the auxiliary link compensation call method provided in this embodiment may also be extended to a scenario in which data is transmitted between two devices (that is, Bluetooth devices) having a Bluetooth communication function by using Bluetooth. For example, the Bluetooth device maybe a smartphone, a notebook computer, a Bluetooth headset, a Bluetooth sound box, an in-vehicle Bluetooth device, a Bluetooth digital audio player, a Bluetooth memory, or the like. This is not limited in this embodiment. For example, in a scenario, the mobile phone sends a call data packet to the Bluetooth headset when the mobile phone answers a call by using the Bluetooth headset in a call process.

In a Bluetooth communication process, the first Bluetooth device and the second Bluetooth device usually establish a Bluetooth link, that is, a primary link, and transmit data by using the primary link. However, in a data transmission process, call quality may be abnormal, such as a data packet loss, jitter, and a relatively large delay, due to reasons, for example, a relatively weak Bluetooth signal.

Therefore, in a possible implementation, when detecting that a Bluetooth signal is relatively weak, the first Bluetooth device or the second Bluetooth device may further establish at least one auxiliary Bluetooth link, so that the first Bluetooth device and the second Bluetooth device can jointly transmit data by using the primary Bluetooth link and the at least one auxiliary Bluetooth link, thereby improving data transmission efficiency.

Optionally, the auxiliary Bluetooth link may be a link established by the first Bluetooth device and the second Bluetooth device by using a Wi-Fi connection, or may be a point-to-point link established according to an IP address and a port number. This is not limited in this embodiment.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

This embodiment further provides an auxiliary-link-based call compensation system. The system includes the foregoing first terminal, second terminal, and core network device. The system can execute the foregoing auxiliary-link-based call compensation method provided in this embodiment.

This embodiment further provides an auxiliary-link-based call compensation apparatus. The apparatus is applied to the foregoing first terminal, and is configured to control the first terminal to perform the auxiliary-link-based call compensation method provided in the foregoing embodiment.

This embodiment provides a computer-readable storage medium. The computer-readable storage medium stores a computer program. When the computer program is executed by a processor, the foregoing auxiliary-link-based call compensation method provided in this embodiment is implemented.

This embodiment provides a computer program product, where the program product includes a program, and when the program is run by a device, a terminal device is enabled to implement the auxiliary-link-based call compensation method provided in the foregoing embodiment.

This embodiment further provides a terminal device, where the terminal device is configured to execute the auxiliary-link-based call compensation method provided in the foregoing embodiment. The function may be implemented by hardware, or may be implemented by hardware executing corresponding software. The hardware or the software includes one or more modules corresponding to sub-functions in the function. Optionally, the terminal device may be user equipment.

Figure 24:
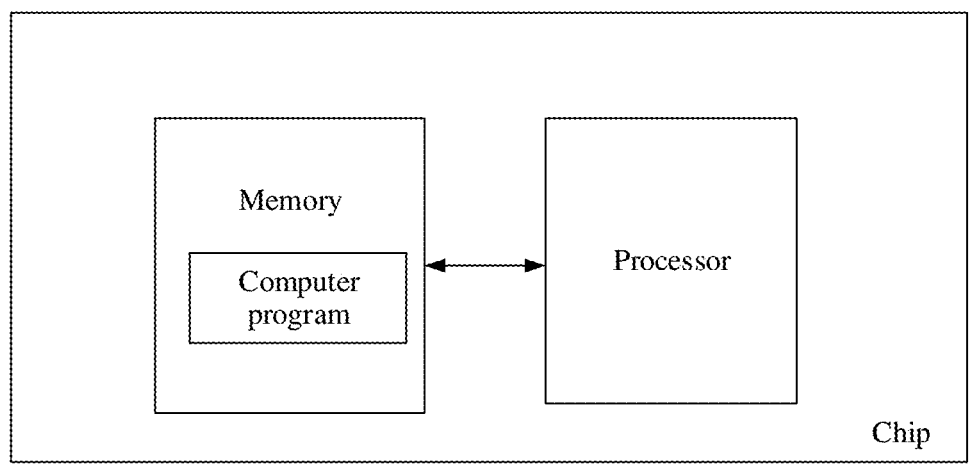
FIG. 24 is a schematic diagram of a structure of a chip according to an embodiment of this application.

This embodiment further provides a chip. Refer to FIG. 24. The chip is applied to the foregoing first terminal, and includes a memory and a processor. The processor executes a computer program stored in the memory, to control the first terminal to perform the auxiliary-link-based call compensation method provided in the foregoing embodiment.

An embodiment of this application further provides an auxiliary link-based communications system, including a first terminal and a second terminal. The first terminal and the second terminal perform OTT communication, and establish a primary link. The first terminal is configured to: establish at least one auxiliary link to the second terminal in response to an auxiliary link establishment condition, where the auxiliary link is different from the primary link; obtain PCM data streams of call data; generate call data packets based on the PCM data streams; and transmit the call data packets with the second terminal by using the primary link and the at least one auxiliary link.

It should be noted that, in a communication process of the system, a bottom-layer PCM data stream obtaining module (for example, a digital signal processor (Analog Device Instrument, ADSP) or an audio recording module (audio record)) may directly obtain PCM data streams of a call, and send the PCM data streams to a communication peer end, without copying and playing a voice packet by using an OTT application layer, so as to reduce impact on an original OTT call link.

An embodiment of this application further provides an auxiliary link-based communications system, including a first terminal and a second terminal. The first terminal and the second terminal are connected by using Bluetooth, and establish a primary link. The first terminal is configured to: establish at least one auxiliary link with the second terminal in response to an auxiliary link establishment condition, where the auxiliary link is different from the primary link; and transmit data packets with the second terminal by using the primary link and the at least one auxiliary link.

Optionally, the auxiliary link establishment condition includes: call quality of the primary link is abnormal; or a Bluetooth signal strength of the first terminal is less than a strength threshold. The auxiliary link is a Wi-Fi link or a data service link.

It should be understood that, the processor mentioned in embodiments of this application may be a central processing unit (Central Processing Unit, CPU), or may be another general purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logic device, discrete gate or transistor logic device, discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Cross reference may be performed between related parts between the method embodiments of this application; and apparatuses provided in the apparatus embodiments are configured to perform the methods provided in corresponding method embodiments. Therefore, the apparatus embodiments may be understood with reference to related parts in the related method embodiments.

The structural diagrams of the apparatuses provided in the apparatus embodiments of this application show only simplified designs of corresponding apparatuses. In actual application, the apparatus may include any quantity of transmitters, receivers, processors, memories, and the like, so as to implement functions or operations performed by the apparatus in the apparatus embodiments of this application, and all apparatuses that can implement this application fall within the protection scope of this application.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An apparatus, wherein the apparatus is configured to control a first terminal to perform:
   establishing at least one auxiliary link with a second terminal in response to an auxiliary link establishment condition, wherein the first terminal and the second terminal are connected through a primary link established using a core network device, wherein the at least one auxiliary link is different from the primary link, wherein the primary link is connected via an access network element device, and wherein the at least one auxiliary link is independent of the access network element device; and
   transmitting call data packets with the second terminal by using the primary link and the at least one auxiliary link.

2. The apparatus according to claim 1, wherein the at least one auxiliary link is one of:
   a point-to-point auxiliary link established according to an internet protocol (IP) protocol or a device to device (D2D) protocol;
   a server auxiliary link established according to an IP protocol or a D2D protocol;
   a core network link based on a base station, wherein both the first terminal and the second terminal are connected to the core network device by using the base station; or
   a core network link based on a wireless fidelity (Wi-Fi) device, wherein both the first terminal and the second terminal are connected to the core network device by using the Wi-Fi device.

3. The apparatus according to claim 2,
   wherein the primary link is the core network link based on the base station, and the at least one auxiliary link is one of the point-to-point auxiliary link, the server auxiliary link, the core network link based on the Wi-Fi device or a second base station; or
   wherein the primary link is the core network link based on the Wi-Fi device, and the at least one auxiliary link is one of the point-to-point auxiliary link, the server auxiliary link, the core network link based on the base station or a second Wi-Fi device.

4. The apparatus according to claim 2, wherein, based on the at least one auxiliary link being the point-to-point auxiliary link, that the first terminal establishes the at least one auxiliary link with the second terminal comprises:
   the first terminal sends an IP address and a port number of the first terminal to the second terminal by using the primary link;
   the first terminal receives a first link detection command sent by the second terminal, wherein the first link detection command indicates whether the IP address and the port number of the first terminal can be used to successfully receive a message; and the first terminal sends a first response message to the second terminal based on the first link detection command.

5. The apparatus according to claim 2, wherein, based on the at least one auxiliary link being the point-to-point auxiliary link, that the first terminal establishes the at least one auxiliary link with the second terminal comprises:

the first terminal receives an IP address and a port number of the second terminal by using the primary link;

the first terminal sends a second link detection command to the second terminal, wherein the second link detection command indicates whether the IP address and the port number of the second terminal can be used to successfully receive a message; and the first terminal receives a second response message sent by the second terminal, wherein the first terminal responds to the second link detection command based on the second response message.

6. The apparatus according to claim 2, wherein, based on the at least one auxiliary link being the server auxiliary link, that the first terminal establishes the at least one auxiliary link with the second terminal comprises:

the first terminal sends an auxiliary link establishment request to a server, wherein the auxiliary link establishment request carries a second feature identifier of the second terminal, and wherein the server sends the auxiliary link establishment request to the second terminal based on the second feature identifier; and the first terminal receives a response message sent by the second terminal, wherein the first terminal responds to the auxiliary link establishment request based on the response message.

7. The apparatus according to claim 2, wherein, based on the at least one auxiliary link being the server auxiliary link, that the first terminal establishes the at least one auxiliary link with the second terminal comprises:

after the primary link is established, the first terminal and the second terminal each actively establish a connection to a server to form the server auxiliary link.

8. The apparatus according to claim 2, wherein, based on the at least one auxiliary link being the point-to-point auxiliary link or the server auxiliary link, the first terminal and the second terminal establish the at least one auxiliary link by using Wi-Fi or cellular data.

9. The apparatus according to claim 8, wherein, based on both the first terminal and the second terminal establishing the at least one auxiliary link by using Wi-Fi, the at least one auxiliary link is always used to transmit a call data packet until a call ends after the at least one auxiliary link is established successfully, or the at least one auxiliary link transmits a call data packet in only a process in which call quality is abnormal.

10. The apparatus according to claim 8, wherein, based on at least one of the first terminal and the second terminal establishing the at least one auxiliary link by using the cellular data, the at least one auxiliary link being always used to transmit a call data packet after the at least one auxiliary link is established successfully, or the at least one auxiliary link being used to transmit a call data packet in only a process in which call quality is abnormal on the primary link.

11. The apparatus according to claim 8, wherein, based on both a first subscriber identity module (SIM) card and a second SIM card being installed in the first terminal, based on a current call card of the first terminal being the first SIM card, and based on a movement rate of the first terminal being greater than a rate threshold, the first terminal preferably uses cellular data of the second SIM card in a process of establishing the at least one auxiliary link.

12. The apparatus according to claim 1, wherein the auxiliary link establishment condition comprises at least one of:

the first terminal receives a dialing operation entered by a user;

the first terminal displays a ringing interface;

the first terminal receives a call answering operation entered by a user;

the first terminal is currently in an abnormal geographical location;

the first terminal is being handed over from a first abnormal cell to a second abnormal cell; or call quality of the first terminal is abnormal on the primary link, wherein the abnormal geographical location, the first abnormal cell, and the second abnormal cell are determined by the first terminal based on a historical call process of the first terminal.

13. The apparatus according to claim 12, wherein the auxiliary link establishment condition is that the call quality of the first terminal is abnormal on the primary link, and wherein that the call quality is abnormal comprises one of:

uplink or downlink quality is abnormal;

uplink or downlink data transmission quality is abnormal;

an encoding format of a call data packet is a preset encoding format on the primary link; or at least one of a sampling rate, an encoding rate, encoding quality, resolution, a frame rate, a quantity of sound channels, or a mean opinion score (MOS) value of the call data packet is less than a respective corresponding threshold on the primary link.

14. The apparatus according to claim 1, wherein that the first terminal transmits the call data packets with the second terminal by using the primary link and the at least one auxiliary link comprises:

the first terminal sends the call data packets to the second terminal by using the primary link and the at least one auxiliary link; and the first terminal receives, by using the primary link and the at least one auxiliary link, the call data packets sent by the second terminal.

15. The apparatus according to claim 14, wherein that the first terminal sends the call data packets to the second terminal by using the primary link and the at least one auxiliary link comprises:

the first terminal sends a plurality of first call data packets to the second terminal by using the primary link, and sends a plurality of second call data packets to the second terminal by using the at least one auxiliary link, wherein the plurality of first call data packets and the plurality of second call data packets are completely the same, or completely different, or partially the same, and wherein a sum of the plurality of first call data packets and the plurality of second call data packets comprises all call data packets collected by the first terminal.

16. The apparatus according to claim 14, wherein that the first terminal sends the call data packets to the second terminal by using the primary link and the at least one auxiliary link comprises:

the first terminal detects an uplink call quality parameter of the first terminal; and the first terminal keeps a sampling rate, an encoding scheme, an encoding rate, encoding quality, resolution, or a frame rate, based on the uplink call quality parameter falling within a preset range, of call data in the sent call data packets unchanged;

the first terminal increases at least one of the sampling rate, the encoding scheme, the encoding rate, the encoding quality, the resolution, or the frame rate, based on the uplink call quality parameter being better than the preset range and continuing to be optimized, of the call data in the sent call data packets; and the first terminal reduces at least one of the sampling rate, the encoding scheme, the encoding rate, the encoding quality, the resolution, or the frame rate, based on the uplink call quality parameter being worse than the preset range and continuing to become worse, of the call data in the sent call data packets.

17. The apparatus according to claim 1, wherein the apparatus is further configured to control the first terminal to perform:

post-processing and playing on the call data packets received by using the primary link and the at least one auxiliary link, wherein the post-processing comprises combination, deduplication, and sorting.

18. The apparatus according to claim 17, wherein, based on a plurality of first call data packets received from the primary link and a plurality of second call data packets received from the at least one auxiliary link having sequence numbers of the same type, the combination comprises:

aggregating the plurality of first call data packets and the plurality of second call data packets into a combined call data packet.

19. The apparatus according to claim 17, wherein, based on a plurality of first call data packets received from the primary link and a plurality of second call data packets received from the at least one auxiliary link having sequence numbers of different types, the combination comprises:

determining link quality parameters of the primary link and each auxiliary link;

determining an optimal call link or at least two auxiliary links based on the link quality parameters; and selecting a call data packet received from the optimal call link as a combined call data packet, or combining call data packets on the at least two auxiliary links to obtain a combined call data packet.

20. The apparatus according to claim 17, wherein, based on a plurality of first call data packets received from the primary link and a plurality of second call data packets received from the at least one auxiliary link having sequence numbers of different types, the combination comprises:

performing audio and video feature fusion on a first call data packet of the plurality of first call data packets received and a second call data packet of the plurality of second call data packets received, to obtain a fused call data packet; and using the fused call data packet as a combined call data packet.

\* \* \* \* \*